United States Patent [19]
Koliopoulos

[11] Patent Number: 5,879,102
[45] Date of Patent: Mar. 9, 1999

[54] CLAMP FOR MINIMIZING INTERPLAY BETWEEN TWO COMPONENTS

[76] Inventor: John A. Koliopoulos, 140 W. 23rd Ave., San Mateo, Calif. 94403

[21] Appl. No.: 858,791

[22] Filed: May 19, 1997

Related U.S. Application Data

[63] Continuation-in-part of Ser. No. 522,605, Sep. 1, 1995, Pat. No. 5,680,976.

[51] Int. Cl.$^6$ ...................................................... F16B 2/18
[52] U.S. Cl. ...................... 403/374.1; 403/110; 403/373; 411/389; 411/537
[58] Field of Search ..................................... 403/110, 373, 403/374, 211, 213, 338, 384, 394, 396, 398, 374.1, 374.2, 374.3; 411/488, 489, 466, 537

[56] References Cited

U.S. PATENT DOCUMENTS

| | | | |
|---|---|---|---|
| 1,523,131 | 1/1925 | Krout | 403/394 X |
| 1,875,969 | 9/1932 | Weiss | 280/506 |
| 2,643,425 | 6/1953 | Jenne | 403/211 X |
| 2,763,498 | 9/1956 | Vaugoyeau | 280/506 |
| 2,894,773 | 7/1959 | Noe | 403/394 X |
| 4,050,714 | 9/1977 | Epp | 280/495 |
| 4,072,257 | 2/1978 | Hall | 224/29 R |
| 5,025,932 | 6/1991 | Jay | 211/20 |
| 5,333,888 | 8/1994 | Ball | 280/504 |
| 5,344,175 | 9/1994 | Speer | 280/506 |
| 5,449,101 | 9/1995 | Van Dusen | 280/506 |
| 5,593,172 | 1/1997 | Breslin | 280/506 |
| 5,680,976 | 10/1997 | Koliopoulos et al. | 224/524 |

FOREIGN PATENT DOCUMENTS

| | | | |
|---|---|---|---|
| 268309 | 9/1963 | Australia | 403/396 |
| 795200 | 5/1958 | United Kingdom | 403/394 |

*Primary Examiner*—Harry C. Kim
*Attorney, Agent, or Firm*—Samuel A. Kassatly

[57] ABSTRACT

A clamp that locks two telescoping components such as a vehicle receiver hitch and a draw bar, for substantially reducing if not eliminating the "banging" or "rattling" between the two components. The clamp includes a standard sized U-bolt, whose throat rests in a seat formed by a receiver hitch collar and a receiver hitch tube. A bar has an arc-shaped cross-section and includes two holes adapted for receiving the threaded ends of the U-bolt. When the draw bar is inserted into the receiver hitch, the arc-shaped side of the bar is positioned within a seat formed by the receiver hitch collar and the draw bar. Standard locking style nuts are threaded onto the legs of the U-bolt and tightened, causing the arc-shaped side of the bar to be wedged against the receiver hitch collar and the draw bar, while wedging the U-bolt throat against the opposite side of the receiver hitch collar and the receiver hitch. This effectively "clamps" or locks the draw bar and the receiver hitch together, eliminating any movement of the two pieces.

15 Claims, 25 Drawing Sheets

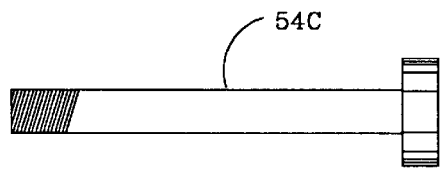
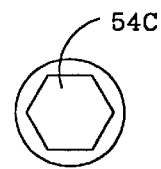
FIGURE 20    FIGURE 21
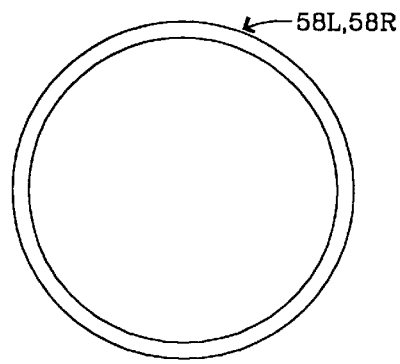
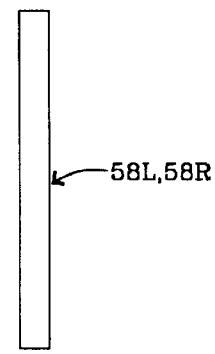
FIGURE 18    FIGURE 19
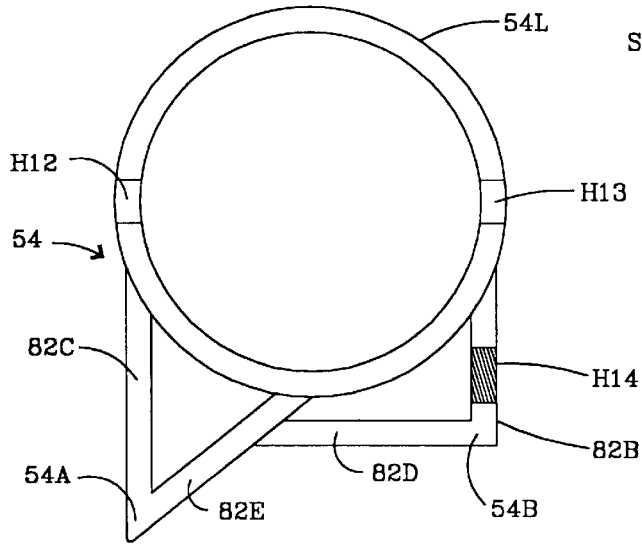
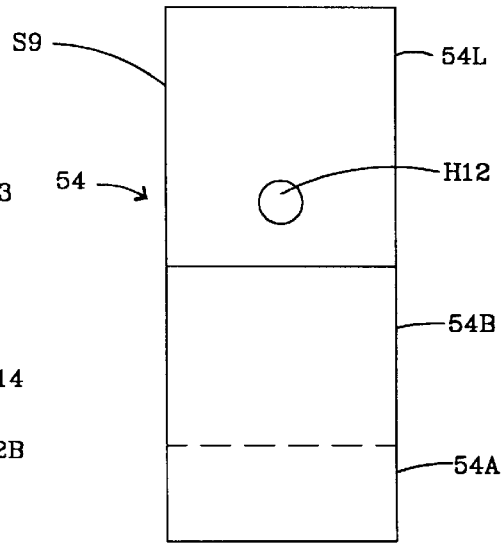
FIGURE 16    FIGURE 17

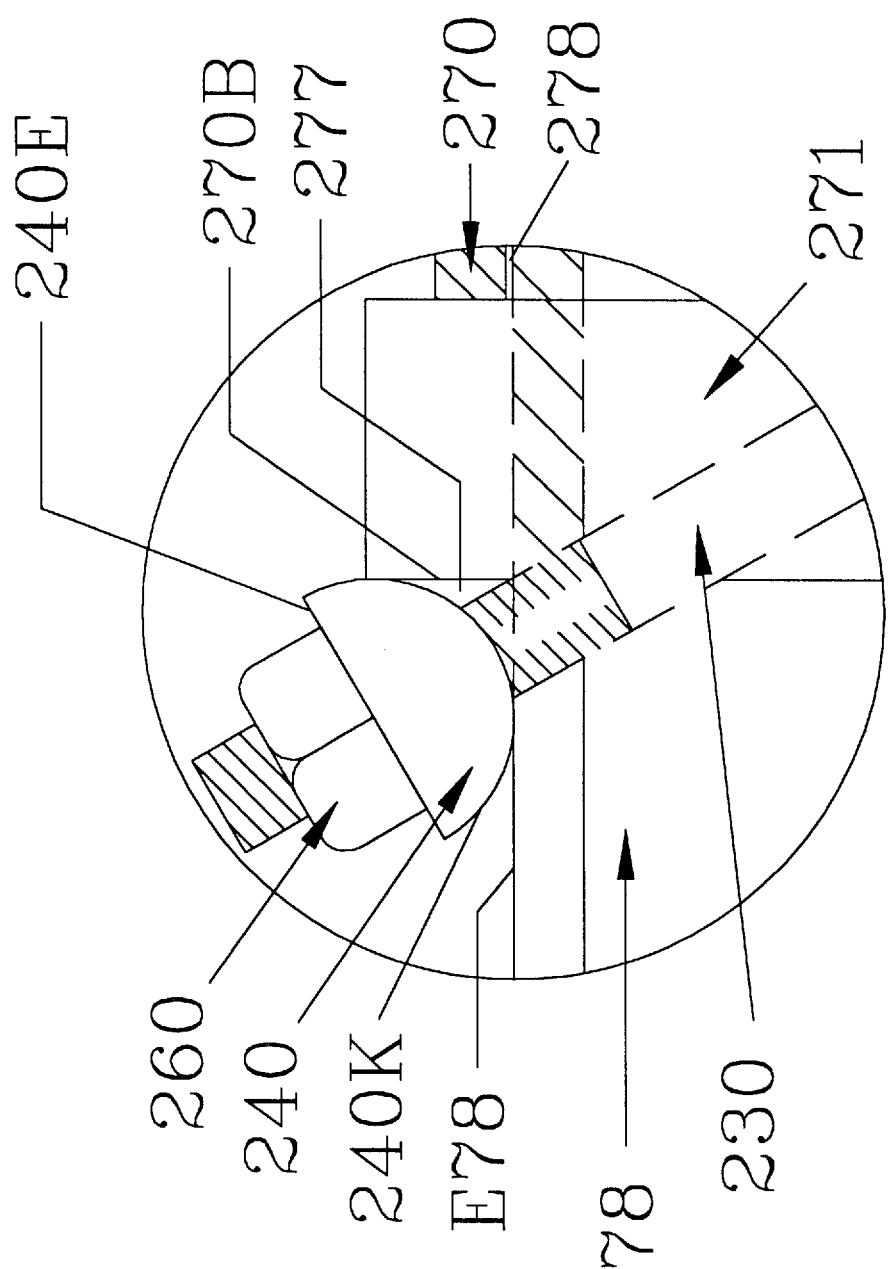

CLAMP FOR MINIMIZING INTERPLAY BETWEEN TWO COMPONENTS

CROSS-REFERENCE TO RELATED APPLICATIONS

The present application is a continuation-in-part of U.S. patent application Ser. No. 08/522,605, filed on Sep. 1, 1995, now U.S. Pat. No. 5,680,976.

BACKGROUND OF THE INVENTION

1. Field of the Invention

The present invention relates in general to clamps. It specifically relates to a clamp for securing a vehicle draw bar and a receiver hitch with minimal relative movement therebetween. The clamp of the present invention can be used in various applications beside vehicles, including but not limited to any application where two tubes and/or bars are telescopically connected.

2. Background Art

Sport Utility Vehicles (SUV) have become quite popular, and many SUV are capable of being fitted with a draw bar incorporating a receiver hitch. Receiver hitches are generally designed to tow a non-motorized wheeled vehicle, such as a boat and/or trailer, behind a motorized vehicle. Other devices can be secured to a vehicle for the purpose of hauling several kinds of cargo. For example, roof top style cargo carriers are known to accommodate luggage, bicycles, and skis. However, lifting the cargo can be difficult, if not impossible without a ladder or some other mechanism to increase the range of the user's height. Access to the cargo is cumbersome and the mounting hardware does not lend itself to convenient installation and dismantling. Also, low height clearances may present some concern.

Several types of carrying devices which utilize the receiver hitch are available. However, these devices are designed with limited functions and for specialized purposes, and are not adaptable to accommodate a multitude, or a wide variety of cargo or accessories. For instance, a carrying device designed to carry bicycles is not readily adaptable, if at all, to accommodate luggage. As a result, the user, and more specifically the consumer, has to acquire several carrying devices to haul various types of cargo and accessories.

In some instances the support structure employed is one and the same with the carrying device. U.S. Pat. No. 5,067,641 to Johnson et al. describes a support structure which is incorporated with the carrying device, for the purpose of carrying bicycles. U.S. Pat. No. 5,038,983 to Tomososki et al., describes a support structure and a carrying tub that form integral units, and which are designed to carry only the content of the tub. The support structure in U.S. Pat. No. 4,635,835 to Cole is designed solely for transporting "All Terrain" vehicles. U.S. Pat. No. 5,145,308 to Vaughn is designed mainly for supporting a platform to haul a motorcycle.

A number of devices which use the vehicle bumper and/or bumper mounting brackets are used as a mounting point, as exemplified in U.S. Pat. No. 5,269,446 to Biehm. Vehicle manufacturers have integrated the bumpers into the vehicle design and attachment to integrated bumpers and/or access to the bumper mounting hardware can be very limited and in some cases impossible.

Also, in recent years, the auto/truck bumper design incorporates plastic or composite materials rather than steel. Sufficient weight bearing characteristics are critical. It is known that many bumpers and bumper mounting hardware are not structurally capable of handling significant weight loads safely. In addition, passenger safety can be affected if bumper safety design is compromised by adding affixments to the bumper or the bumper mounting points.

Additionally, ground clearance at the rear of the vehicle is crucial. Extension of the horizontal plane of the receiver hitch behind the vehicle can damage the carrying device and/or the cargo when a load is placed on the carrying device. Safety issues arise, with the vehicle in motion, if the carrying device collides with an obstruction or some other roadway obstacle. Also, with a load at a lower horizontal plane, user safety is compromised by lifting heavy objects from the carrying device.

Furthermore, conventional devices are installed in a fixed position, and significantly limit access to the rear of the vehicle. The cargo and/or the carrying device must be removed for the rear of the vehicle to become accessible. Yet another limitation of the conventional devices is that the carrying device remains in one fixed position when not in use.

Such exemplary conventional devices are illustrated in the following references:

U.S. Pat. No. 5,219,105 to Kravitz,
U.S. Pat. No. 5,145,308 to Vaughn,
U.S. Pat. No. 5,137,411 to Eul et al.,
U.S. Pat. No. 5,122,024 to Stokes,
U.S. Pat. No. 5,067,641 to Johnson et al.,
U.S. Pat. No. 5,011,361 to Peterson,
U.S. Pat. No. 4,971,509 to Sechovec,
U.S. Pat. No. 4,938,399 to Hull et al.,
U.S. Pat. No. 4,934,894 to White,
U.S. Pat. No. 4,915,276 to Devito,
U.S. Pat. No. 4,813,584 to Wiley,
U.S. Pat. No. 4,741,660 to Kent,
U.S. Pat. No. 4,640,658 to Webb, Jr.,
U.S. Pat. No. 4,635,835 to Cole, and
U.S. Pat. No. 1,849,046 to Arndt.

Rattling between a vehicle draw bar and a receiver hitch is a persistent concern for the industry. Typically, a square draw bar or tube is sized to fit and to be inserted into a receiver hitch, which is also a square tube. The draw bar and the receiver hitch are not generally manufactured to exacting tolerances, which allows ease of installation and removal by the user. The two pieces are maintained in position relative to one another by way of a locking pin that passes through transversely aligned pairs of holes in both pieces.

When a draw bar is utilized to tow a trailer, for example, swaying motion as well as side to side movement, can occur when the vehicle is moving over a road surface, causing the draw bar to shift within the receiver hitch and resulting in significant "banging" or vibration. When this occurs, the result can be quite alarming to the driver of the towing vehicle. If the vibration or "banging" is severe enough, damage could result to the draw bar, receiver hitch and/or locking pin, and other vehicle control problems could develop. A similar vibration or "banging" condition occurs when accessories, such as bike or ski mounts, or cargo/accessory carriers are inserted into the receiver hitch.

Over the years, different configurations have been designed to eliminate "rattling" between the receiver hitch and the draw bar. One attempted solution is illustration in U.S. Pat. No. 5,593,172 to Breslin, which describes a collar that surrounds the receiver hitch and draw bar combination which is "pinned" together by way of screws that press against the exterior walls of the receiver hitch and draw bar tubes. Another attempted solution is described in U.S. Pat. No. 4,050,714 to Epp, wherein two "plates" surround the draw bar tube. Two "rectangular portions" are affixed to the draw bar tube and, by way of a series of nuts and bolts, a force is applied to move the draw bar away from the receiver hitch in a direction parallel to the longitudinal axis of the hitch.

Other clamps are described in the following references:

U.S. Pat. No. 5,449,101 to Van Dusen, shows a rack carrier mounted into a receiver hitch which incorporates a bolt that keeps the rack from "rattling" in the receiver hitch;

U.S. Pat. No. 5,344,175 to Speer, shows a spring loaded pin that eliminates movement between the receiver hitch and the trailer hitch;

U.S. Pat. No. 5,333,888 to Ball, illustrates a wedge that eliminates play between the trailer hitch and the receiver hitch;

U.S. Pat. No. 5,025,932 to Jay, shows a bicycle rack and a carrier that includes a bolt used to minimize movement between the bicycle rack and the receiver hitch;

U.S. Pat. No. 4,072,257 to Hall, shows a load carrying device that includes many parts attached to the load carrying apparatus to assist in minimizing movement;

U.S. Pat. No. 2,763,498 to Vaugoyeau, shows a means of taking up play in vehicle couplings constituted by between hooks and rings; and U.S. Pat. No. 1,875,969 to Weiss, relates to a drawbar apparatus for trailers.

However, none of these conventional clamps combines all the following features and advantages: simplicity, effectiveness, extensive use of standard hardware, and minimum fabrication.

SUMMARY OF THE INVENTION

The present invention is directed toward a simple and unique clamp that locks two telescoping components such as a receiver hitch and a draw bar, for substantially reducing if not eliminating the "banging" or "rattling" between the two components. The receiver hitch has a square internal cross-section, and is sized to accept a draw bar having a square shaped external cross-section. Typically, these two components are not manufactured to exacting tolerances, and a considerable space or vacancy is created therebetween. Such space allows for a relative play or movement between the two components, resulting in vibration or "banging".

The present invention aims at significantly reducing and preferably eliminates the clearance between the two components along one or more sides, which object is herein also referred to as reduction of the "dimensional spacing" between the two components.

The foregoing and other objects and features of the present invention are realized by a clamp that locks the two components together. In one embodiment the clamp includes a standard sized U-bolt, whose throat rests on the receiver hitch collar and the adjacent perpendicular exterior flat surface of the receiver hitch tube.

A bar having an arc-shaped cross-section, i.e., a substantially semi-circular cross-section, along at least a portion of its length, includes holes that are spaced apart by the same distance as the threaded ends of the U-bolt. When the draw bar is inserted into the receiver hitch, the bar is positioned so that the arc-shaped (for example convex) side of the bar rests on the draw bar and the receiver hitch collar so that the threaded ends of the square U-bolt can be inserted into the corresponding holes of the bar, with the throat of the U-bolt resting on the opposite side of the receiver hitch collar and the adjacent perpendicular exterior flat surface of the receiver hitch tube.

Standard locking style nuts are threaded onto the legs of the U-bolt and tightened, causing the convex side of the bar to be wedged against the receiver hitch collar and the draw bar, while wedging the U-bolt throat against the opposite side of the receiver hitch collar and the receiver hitch. This effectively "clamps" or locks the draw bar and the receiver hitch together, eliminating any movement of the two pieces.

The clamp of the present invention can be adapted to any size receiver and draw bar combination, is simple to mass produce, install, and remove. It can be manufactured for installation with or without the use of tools. The clamp is effective, uses mostly standard readily available hardware, and requires minimal fabrication.

BRIEF DESCRIPTION OF THE DRAWING

The above and other features of the present invention and the manner of attaining them, will become apparent, and the invention itself will be best understood, by reference to the following description and the accompanying drawings, wherein:

FIG. 16 is a side elevational view of a platform support sleeve which forms part of the door assembly of FIGS. 12 and 15;

FIG. 17 is a front elevational view of a platform support sleeve which forms part of the door assembly of FIGS. 12, 15 and 16;

FIG. 18 is a side elevational view of a sleeve spacer which forms part of the door assembly of FIG. 12;

FIG. 19 is a front elevational view of a sleeve spacer which forms part of the door assembly of FIG. 12;

FIG. 20 is a side elevational view of a sleeve bolt which forms part of the door assembly of FIGS. 12 and 15;

FIG. 21 is a front elevational view of a sleeve bolt which forms part of the platform support sleeve of FIGS. 12 and 15;

FIG. 32A is a greatly enlarged, close-up view of one seat forming part of the clamp of the present invention.

Similar numerals refer to similar elements in the drawing. It should be understood that the sizes of the different components in the Figures are not in exact proportion, and are shown for visual clarity and for the purpose of explanation.

DETAILED DESCRIPTION OF THE PREFERRED EMBODIMENT

Figure 1:
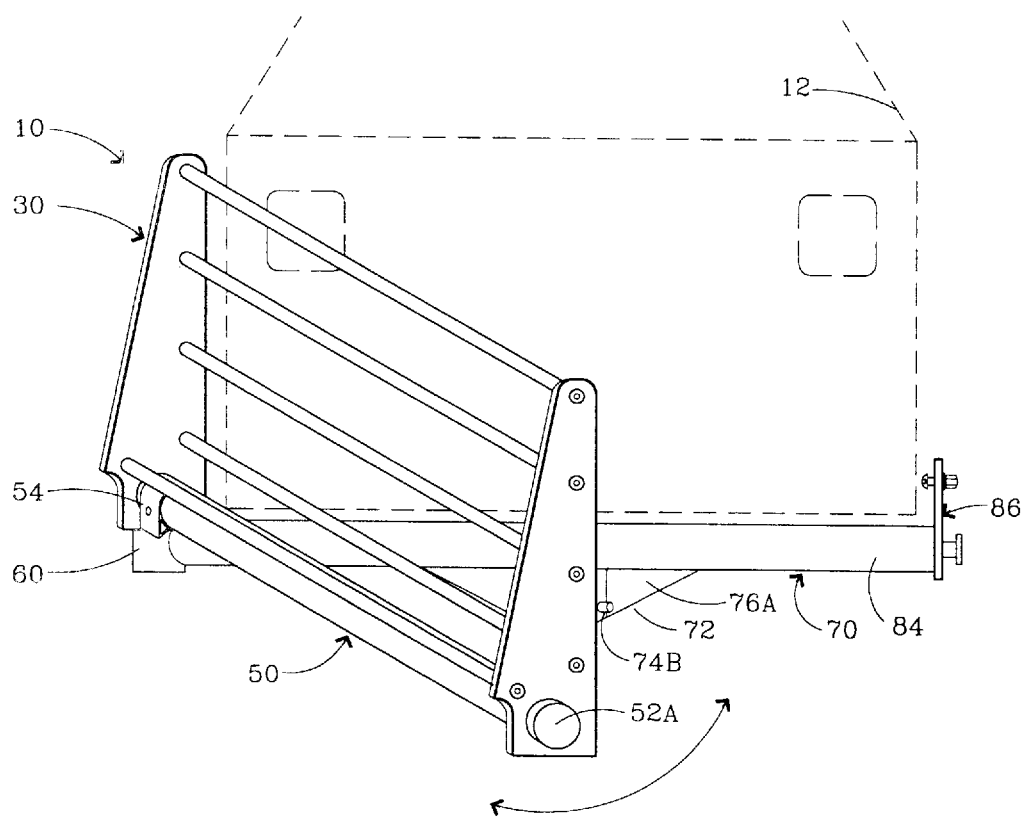
FIG. 1 is a perspective view of a preferred embodiment of a multi-functional accessory carrier according to the present invention, comprised of a riser assembly, a door assembly, and a platform assembly, and shown secured to the rear of a vehicle in an upright, partially open vertical position.

A preferred embodiment of a multifunctional cargo/accessory carrier 10 is illustrated in FIGS. 1 through 4, and is shown secured to the rear of a vehicle 12 (shown in dashed lines). The carrier 10 generally includes a riser assembly 70, a door assembly 50 and a platform assembly 30. The platform assembly 30 is attached to the door assembly 50, which, in turn, is pivotally secured to the riser assembly 70. In this particular example, most of the main components forming the riser assembly 70 and the door assembly 50 are made of stainless steel, and most of the main components forming the platform assembly 30 are made of aluminum.

Figure 6:
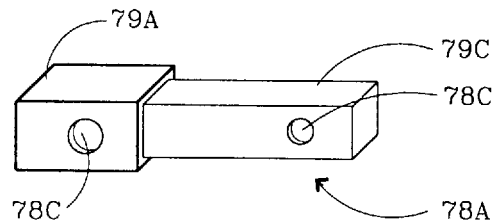
FIG. 6 is a perspective side elevational view of a second design for a receiver insert tube forming part of the riser assembly.
Figure 7:
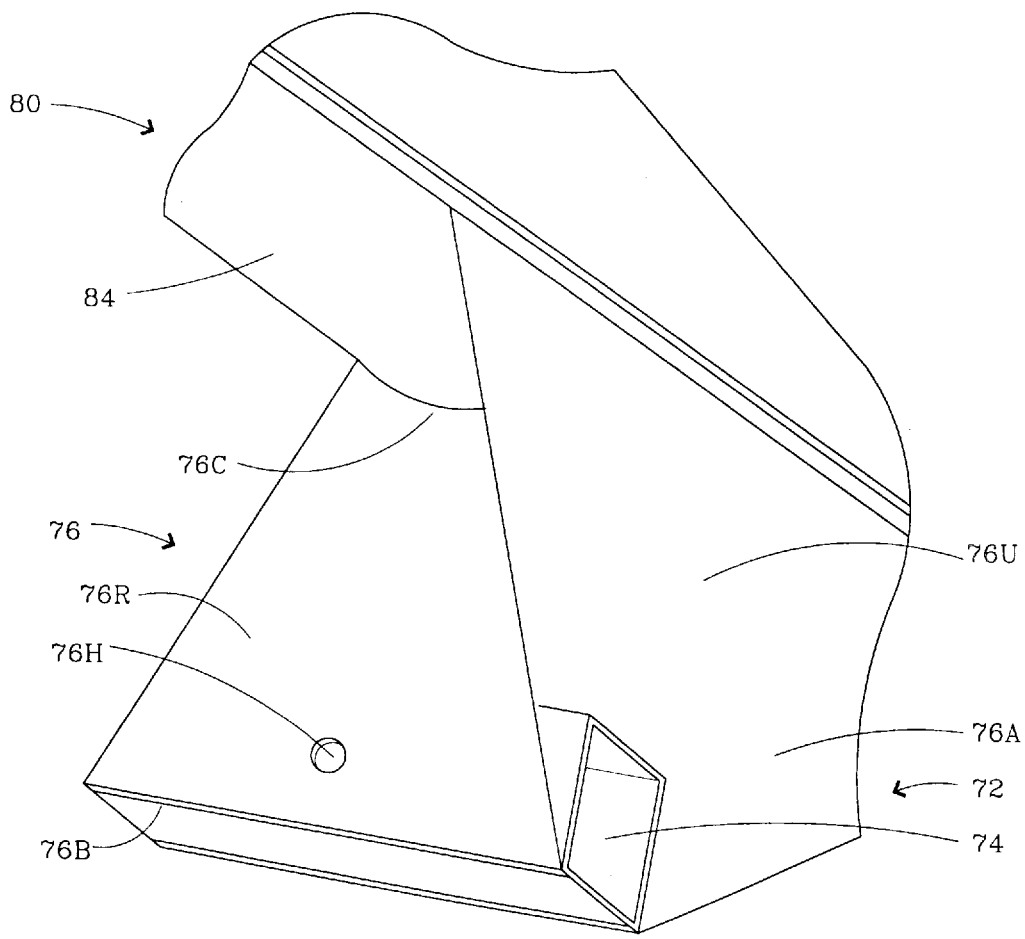
FIG. 7 is a perspective rear view of a gusset assembly forming part of the riser assembly, to receive the receiver insert tube of FIGS. 5 or 6.
Figure 7A:
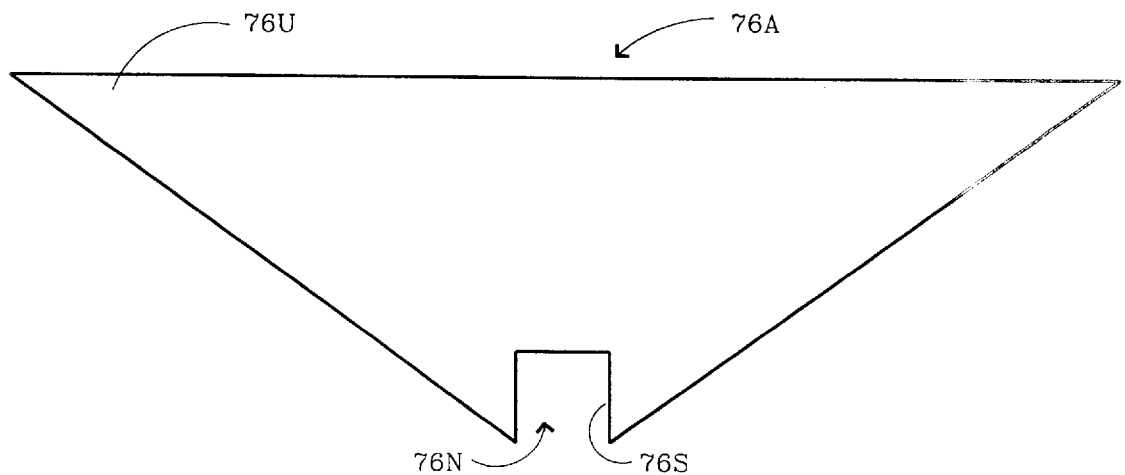
FIG. 7A is a rear elevational view of the rear gusset which forms part of the gusset assembly of FIGS. 1, 2, 4 and 7.

The riser assembly 70 includes a gusset assembly 72 (shown in FIG. 7) which is secured to a vehicle receiver hitch (not shown), and which includes a hollow elongated receiver tube 74, a plurality of vertical gussets that are collectively referred to by the reference numeral 76, and a riser beam assembly 80. The receiver tube 74 is hollow, tubular, and can have a square or rectangular cross-section. It is sized to receive, and to be adjustably secured to a hollow receiver insert tube 78 (shown in FIG. 5) or 78A (shown in FIG. 6), via a locking style hitch pin 74B (shown in FIGS. 1 through 4) inserted into corresponding holes 78B or 78C in the receiver insert tube 78 or 78A, as well as into holes 76H in the vertical gussets 76.

Figure 2:
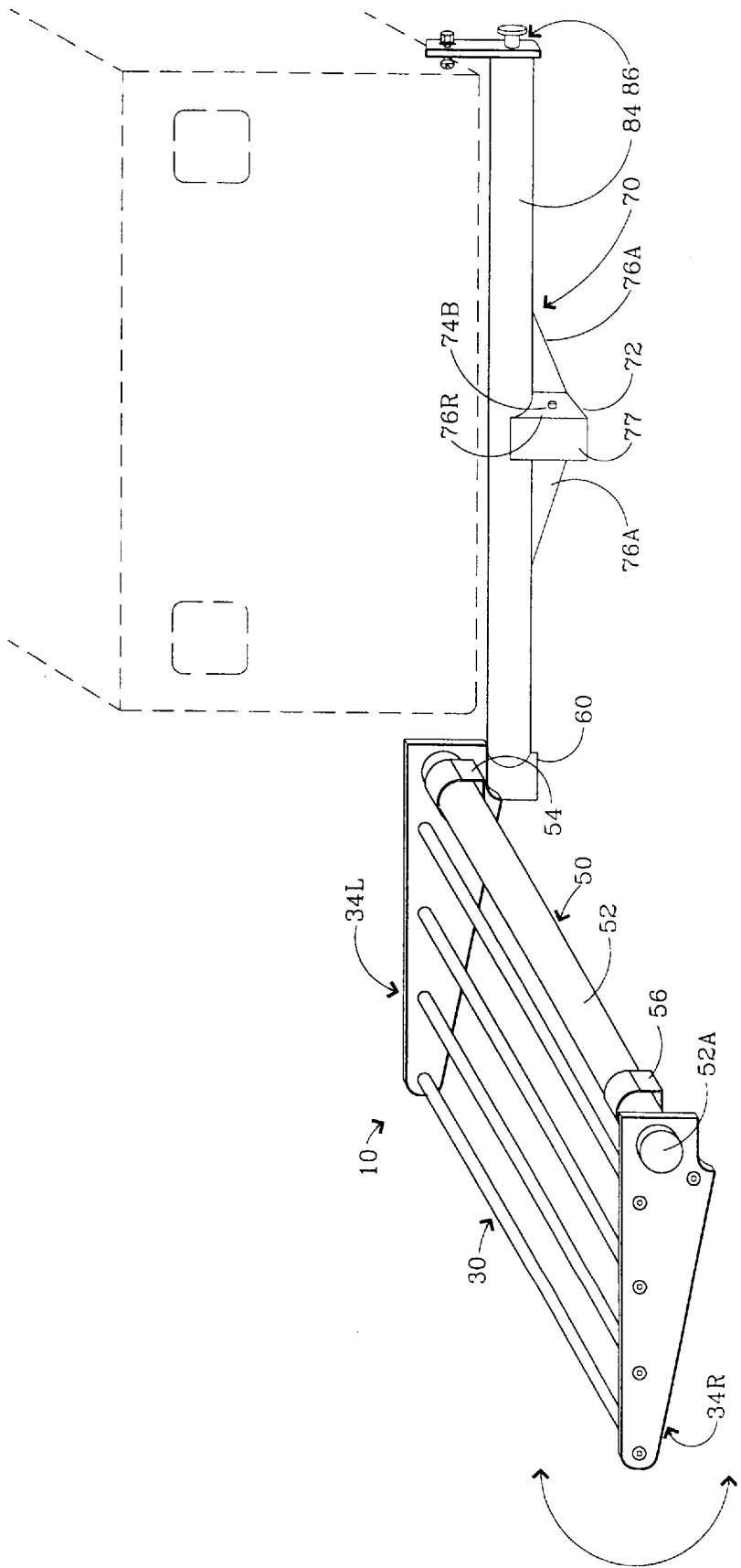
FIG. 2 is a front perspective view of the carrier of FIG. 1 shown in a fully extended, open horizontal position, away from the rear of the vehicle.
Figure 4:
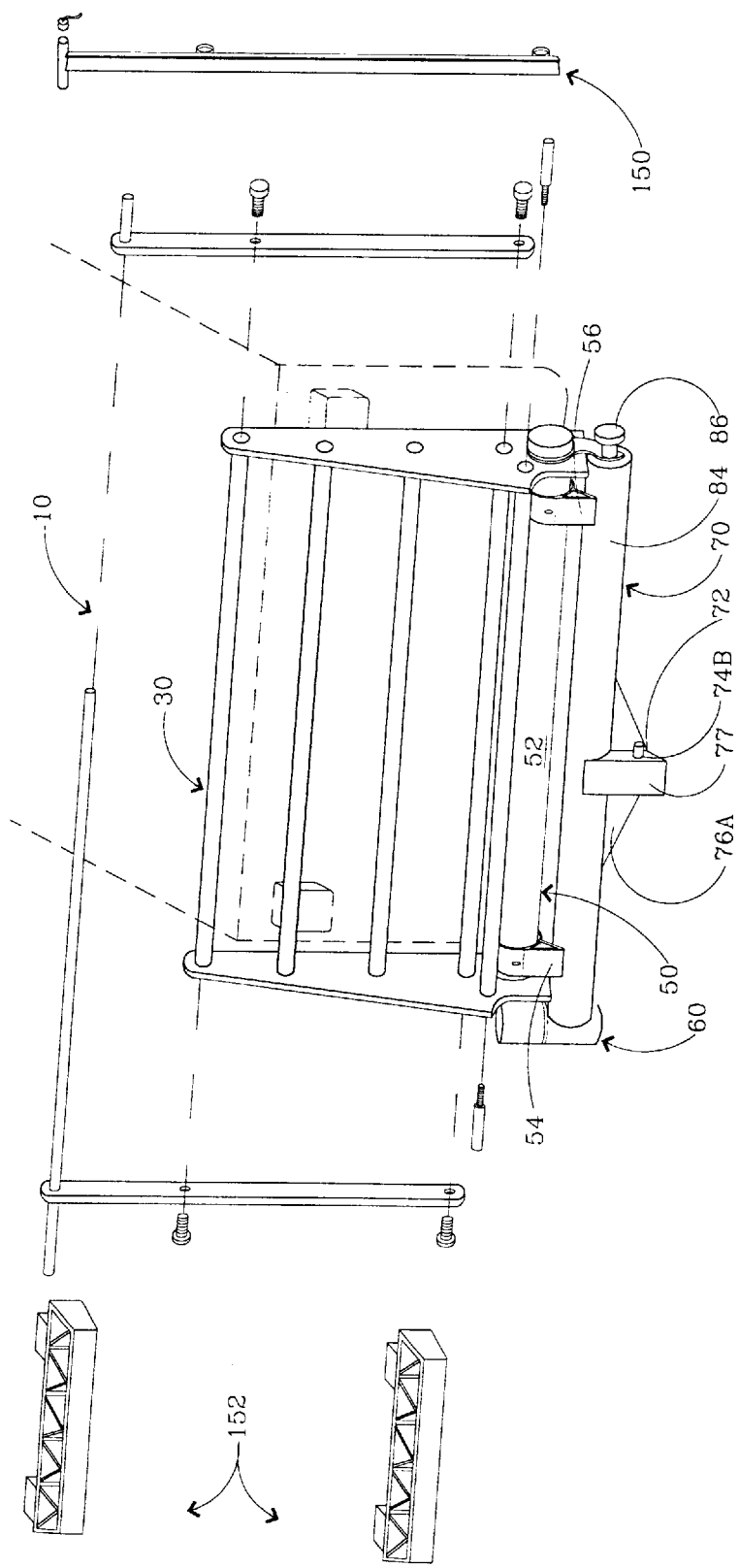
FIG. 4 is a front perspective view, showing partly exploded accessory mounts for mounting ski rack (left) and bicycle rack (right), illustrating the carrier of FIGS. 1 through 3 in an upright, fully closed vertical position.
Figure 8:
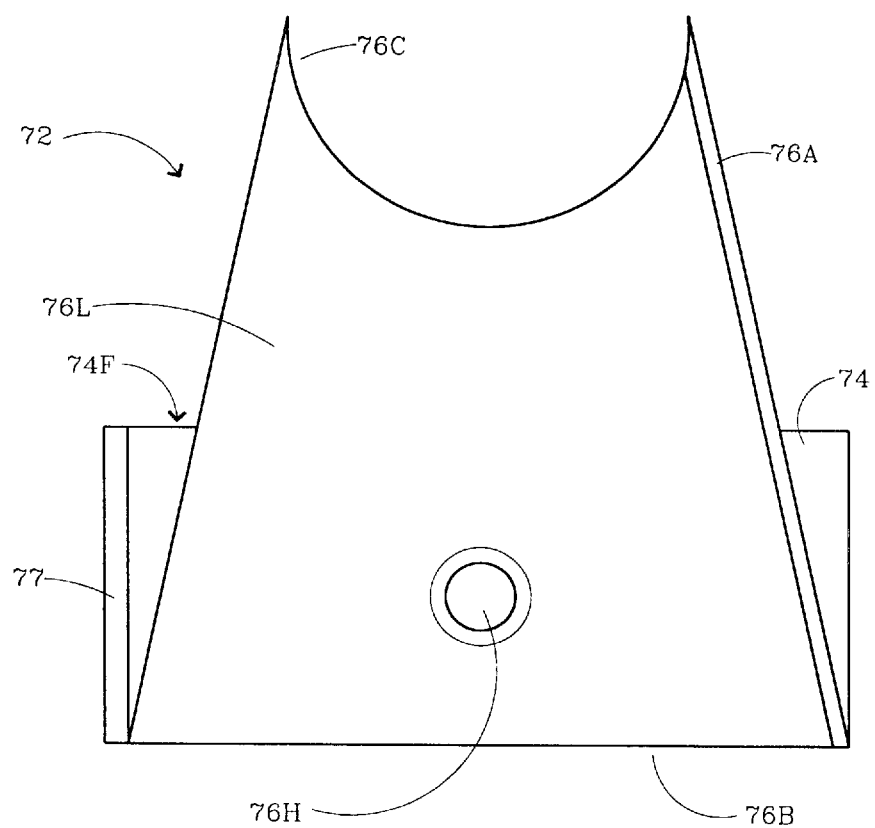
FIG. 8 is a side elevational view of the gusset assembly shown in part in FIGS. 1, 2, and 4, and all of FIG. 7.

Referring to FIGS. 2, 4, and 8, the vertical gussets 76 secure the gusset assembly 72 to the riser beam assembly 80, and include a left gusset 76L, a right gusset 76R, and a rear gusset 76A that are affixed together by means of conventional methods, such as by welding. The left gusset 76L and the right gusset 76R surround part of the receiver tube 74, and are affixed to the bottom and center of the riser beam assembly 80.

The left and right vertical gusset 76L, 76R respectively, are generally identical, and therefore only the left vertical gusset 76L will be described in more detail with further reference to FIGS. 1, 2 and 5 through 8. The left vertical gusset 76L is generally flat, and has a thickness of approximately ¼ inch. It has a straight bottom base 76B that is about 6 inches long, and an upper generally semi-circularity shaped collar 76C which is separated from the bottom base 76B by about 3 inches to 3.75 inches. The collar 76C is dimensioned to form a semi-circular notch for accepting a tube having an external diameter of 3 inches, such as the riser beam 84 which is a part of the riser beam assembly 80. The left and right vertical gusset 76L and 76R are mated and attached to the receiver tube 74, as explained above, by means of the locking style hitch pin 74B that is inserted into the holes 78B or 78C in the receiver insert tube 78 or 78A, and the holes 76H in the vertical left and right vertical gussets 76L and 76R. These holes 78B (or 78C), 76L and 76R are positioned in registration with each other so as to allow the pin 74B to be inserted therethrough.

The ability to manufacture the receiver insert tube 78 or 78A to different lengths and the attachment of the receiver insert tube 78 or 78A to the gusset assembly 72 enables the carrier 10 to be adjusted closer or farther from the vehicle, in order to accommodate differences in vehicles, such as custom versus standard bumpers, and externally mounted spare tires, as were mentioned earlier. The carrier 10, which is formed of the platform assembly 30, door assembly 50, riser assembly 70 including the receiver insert tube 78 or 78A, is assembled as a single unit, and attached to the vehicle receiver hitch, via the receiver insert tube 78 or 78A, being inserted into the vehicle receiver hitch thus enabling the carrier 10 to adapt to any type of vehicle, regardless of make, model or size.

Figure 7B:
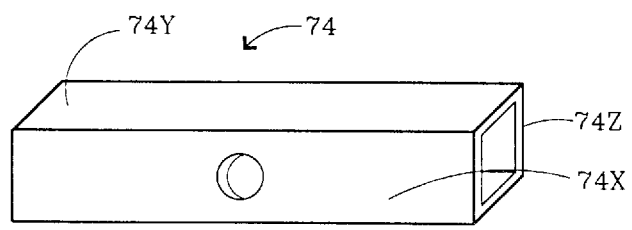
FIG. 7B is a side perspective view of the receiver tube which forms part of the gusset assembly in FIGS. 1, 2, 4 and 7.

As shown in FIGS. 2, 4, 7, 7A and 7B, the rear gusset 76A is generally flat and triangularly shaped, and is approximately ¼ inch thick. It includes an upper base 76U that is about 22 inches long, and a square notch 76N with a dimension of 2.5 inches, on each side, for receiving three external sides 74X, 74Y and 74Z of the receiver tube 74 (FIG. 7B). The rear gusset 76A is attached on the vehicle side of the gusset assembly 72. The gusset assembly 72 (FIG. 7) provides additional vertical ground clearance above and beyond the horizontal plane of the vehicle receiver hitch, and also eliminates the need for attachment to the bumper or bumper mounting brackets of the vehicle, and further improves user safety by raising the height of the load and minimizing the affects of lifting heavy objects from a low horizontal plane.

Referring to FIGS. 2, and 4 through 8, the receiver tube 74 is about 6 inches long and 2.5 inches square in cross section. The receiver tube 74, may optionally be capped, at its front end 74F, with a cap 77. At one end 79 (FIG. 5) or 79A (FIG. 6), the receiver insert tube 78 or 78A, respectively, fits inside the receiver tube 74, while at its other end 79B or 79C, respectively, it is secured to, and fits inside the vehicle receiver hitch (not shown). At its end 79 or 79A, the receiver insert tube 78 or 78A has a square external cross-section with a side dimension of 2 inches. The other end 79B or 79C of the receiver insert tube 78 or 78A is sized to selectively fit the square interior cross-section of the vehicle receiver hitch, for instance 2 inches or 1.25 inches, thus enabling the carrier 10 to adapt the two most commonly used receiver hitch sizes. Other hitch sizes can also be accommodated by modifying the dimensions and shape of the receiver insert tube 78 or 78A.

The receiver insert tube 78 or 78A (FIGS. 5 and 6) is about 16 inches long, and slides into the receiver tube 74 for the full length of the receiver tube 74, thus enabling ease of installation. As explained above, the locking style hitch pin 74B (FIGS. 1 through 4) passes through the transversely aligned pair of circular holes in the receiver tube 74, in the left and right vertical gussets 76L, 76R, and in the receiver insert tube 78 or 78A, ends 79 or 79A respectively, for enabling a safe and secure means of attachment. The opposite end 79B or 79C of the receiver insert tube 78 or 78A also has transversely aligned pair of holes 78B, 78C, respectively, which align with a pair of transversely aligned holes (not shown) in the vehicle receiver hitch and another locking style hitch pin 74B is passed through these transversely aligned holes, enabling simple, easy installation and removal of the carrier 10. The locking style hitch pins 74B provide a deterrent to the tampering or removal of the carrier 10 by a vandal.

Referring to FIGS. 1, 2, and 4, and 9 through 14 and 22, the riser beam assembly 80 will be described in greater detail. The riser beam assembly 80 generally includes two platform stops: a left platform stop 82L, and a right platform stop 82R; a riser beam 84; and a latch assembly 86. The riser beam 84 is attached at one of its ends to the latch assembly 86, for instance the right end as viewed in FIG. 1, in order to facilitate the opening, closing and securing of the door beam 52, which forms part of the door assembly 50, to the riser beam 84. The other opposing end of the riser beam 84 is attached to the door assembly 50, via hinge assembly 60 in order to rotate the door assembly 50 away from the vehicle so that rear access to the vehicle is unobstructed. The riser beam 84 is a hollow cylindrical tube that measures approximately 50 inches in length. It has an external diameter of 3 inches, and is about ⅛ inch thick, prior to coping one of its ends to precisely mate the external diameter of hinge assembly 60, as shown in FIGS. 9 through 12 and 22.

Figure 9:
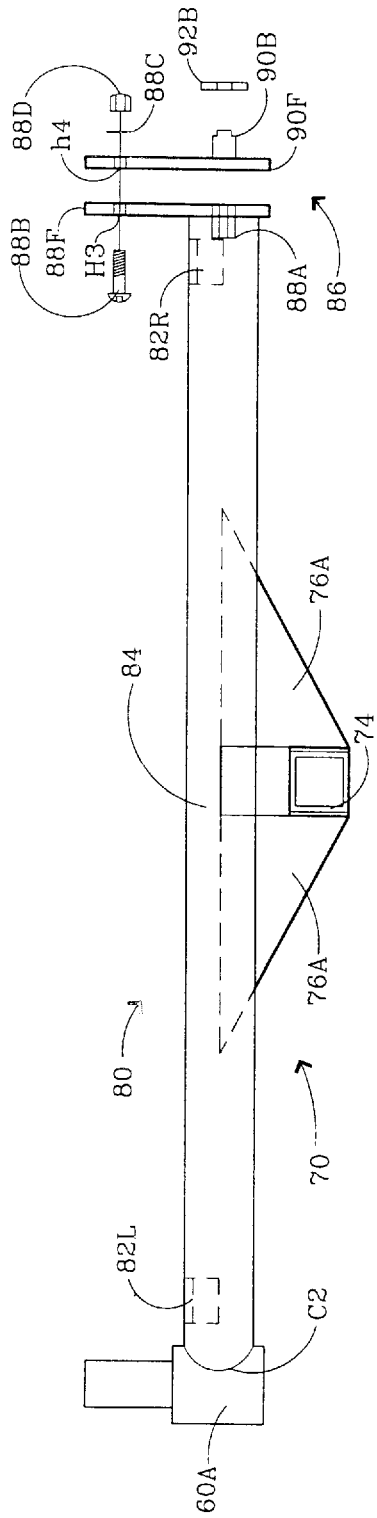
FIG. 9 is a front view of the assembled riser assembly of FIGS. 1, 2 and 4.
Figures 13, 14:
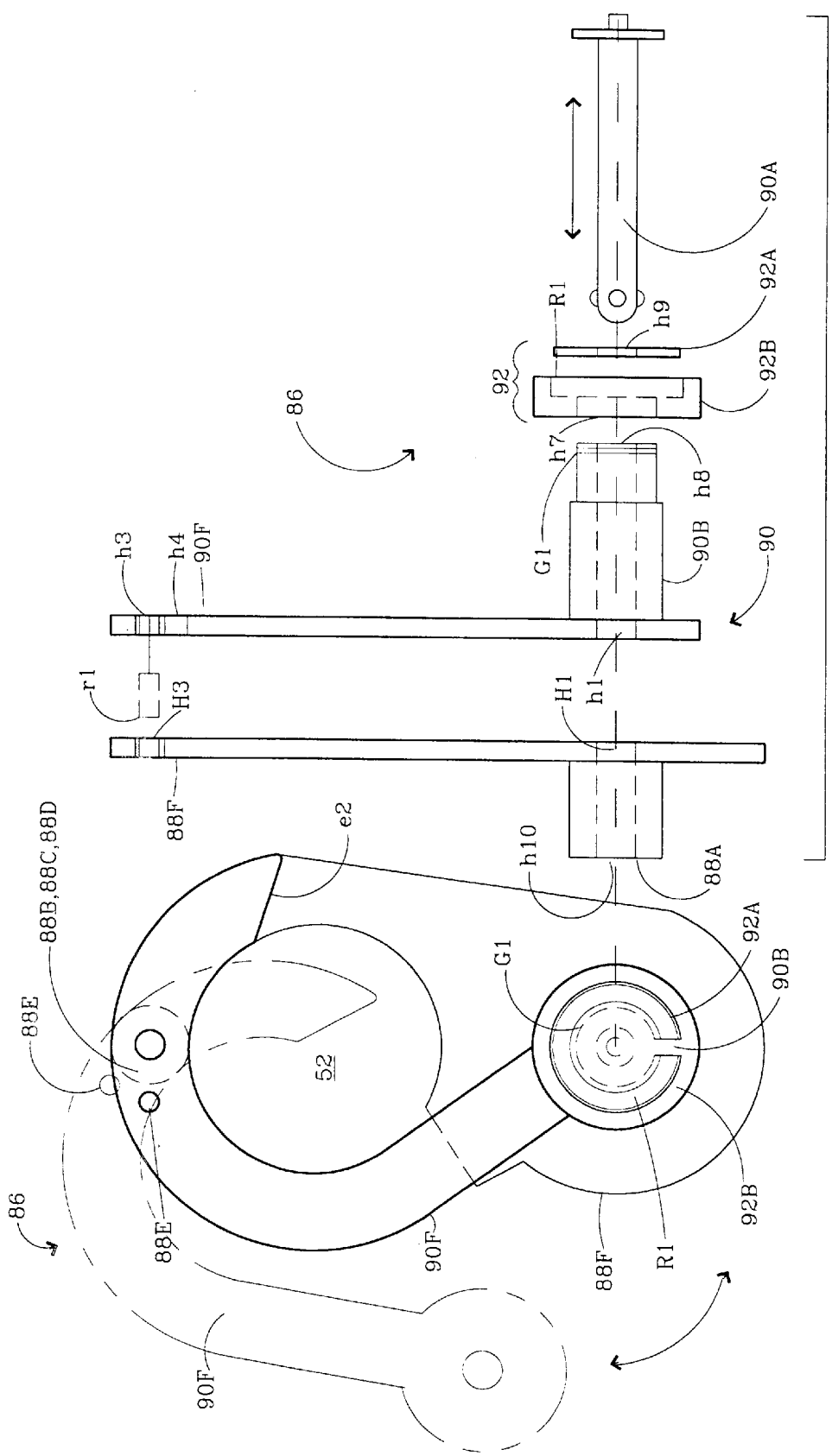
FIG. 13 is a side elevational view of a latch assembly which forms part of the riser assembly of FIGS. 9 through 12.
FIG. 14 is an exploded, front elevational view of the latch assembly of FIG. 13 and seen in part in FIG. 9.

The latch assembly 86 is partly shown in FIG. 9, and is further illustrated in more details in FIGS. 13, 13A, 13B and 14. It generally includes a cradle 88, an actuator crank 90, and a handle assembly 92. As seen in FIGS. 9 and 14, the cradle 88 is formed of a cradle base 88F, an inner spacer tube 88A, a machine bolt 88B, a washer 88C, a nut 88D and a stop pin 88E. The cradle base 88 is welded to one end of the riser beam 84.

The actuator crank 90 shown in FIGS. 13, 13A, 13B and 14, is formed of a quick release pin 90A, an outer spacer tube 90B, and an actuator base 90F. The actuator crank 90 is attached to the cradle base 88 by means of machine bolt 88B, measuring 1¼ inches long by ⅜ inches in diameter, ⅜ inch washer 88C and ⅜ inch locking style nut 88D. Machine bolt 88B is passed through hole H3 of the cradle base 88F, hole h4 of the actuator base 90F and washer 88C, and is tightened by nut 88D, to allow minimum wobble of the actuator base 90F, yet provide bind free rotation of the actuator base 90F around machine bolt 88B. As the actuator crank 90 has limited clockwise rotation by way of roll pin r1, when roll pin r1, measuring ½ inches in length by ¼ inches in diameter, is inserted flush into hole h3, on the handle assembly 92 side of actuator base 90F. This rotation limiting factor allows for unobstructed passage of the door beam 52 past the actuator crank 90 when the actuator crank 90 is rotated to its furthest most clockwise position.

Referring to FIG. 14, the handle 92 includes a snap ring 92A and a handle 92B. A snap ring 92A is inserted in a corresponding recess R1 within handle 92B, to fit a corresponding groove G1 on the outer spacer tube 90B, to hold handle 92B in place on the outer spacer tube 90B. The quick release pin 90A is inserted through coaligning central holes in the snap ring 92A hole h9, the handle 92B hole h7, outer spacer tube 90B hole h8, actuator base 90F hole h1, cradle base 88F hole H1, and inner spacer tube 88A hole h10. This allows for the securing of the latch assembly 86 by means of the quick release pin 90A so that a user can secure the latch assembly 86 in a closed position and remove the quick release pin 90A to open the latch assembly 86, at the user's discretion.

Figure 13A:
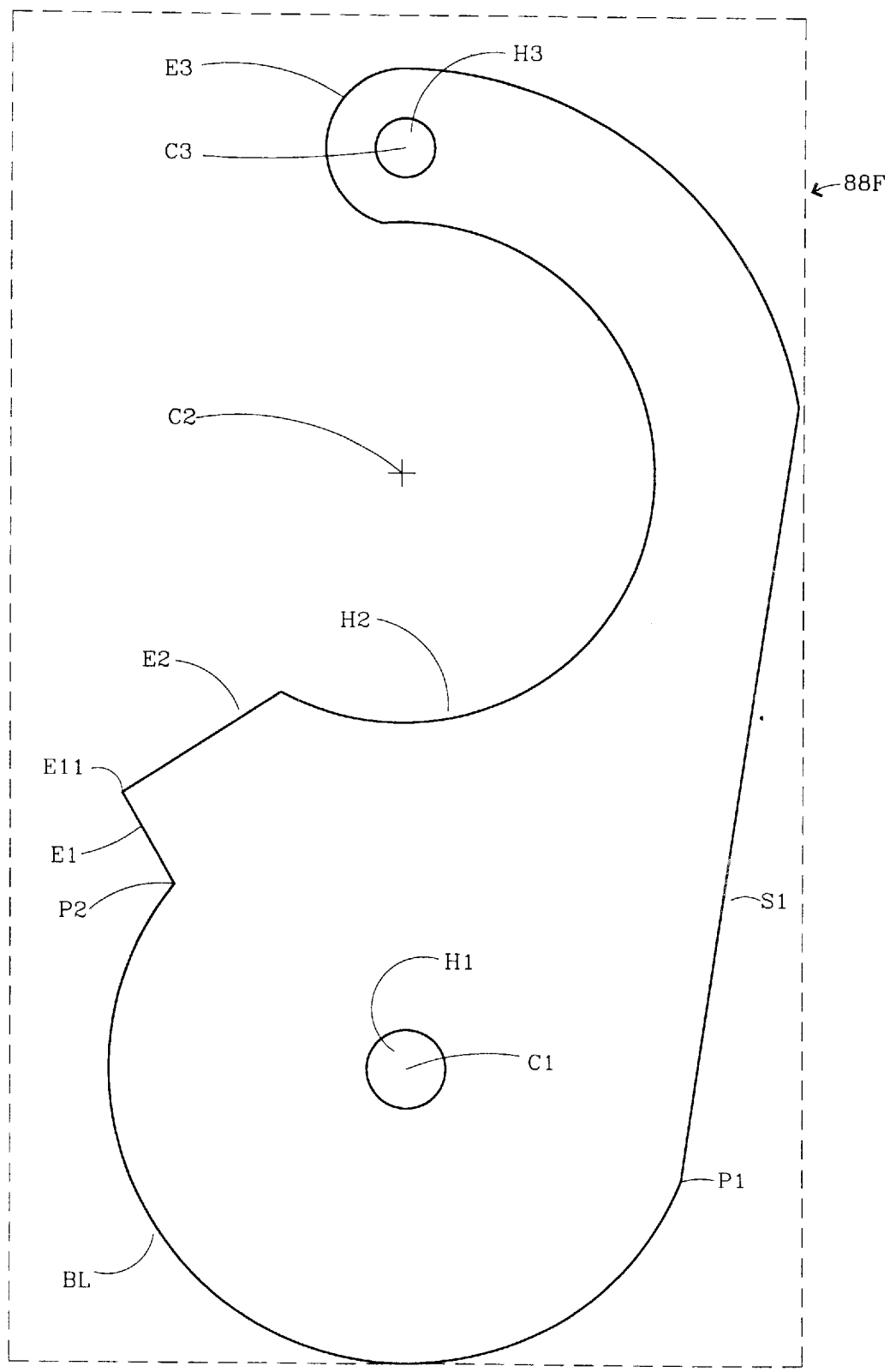
FIG. 13A is a side view of a cradle base which forms part of the latch assembly in FIGS. 13 and 14, and seen in part in FIGS. 9 and 10.
Figure 13B:
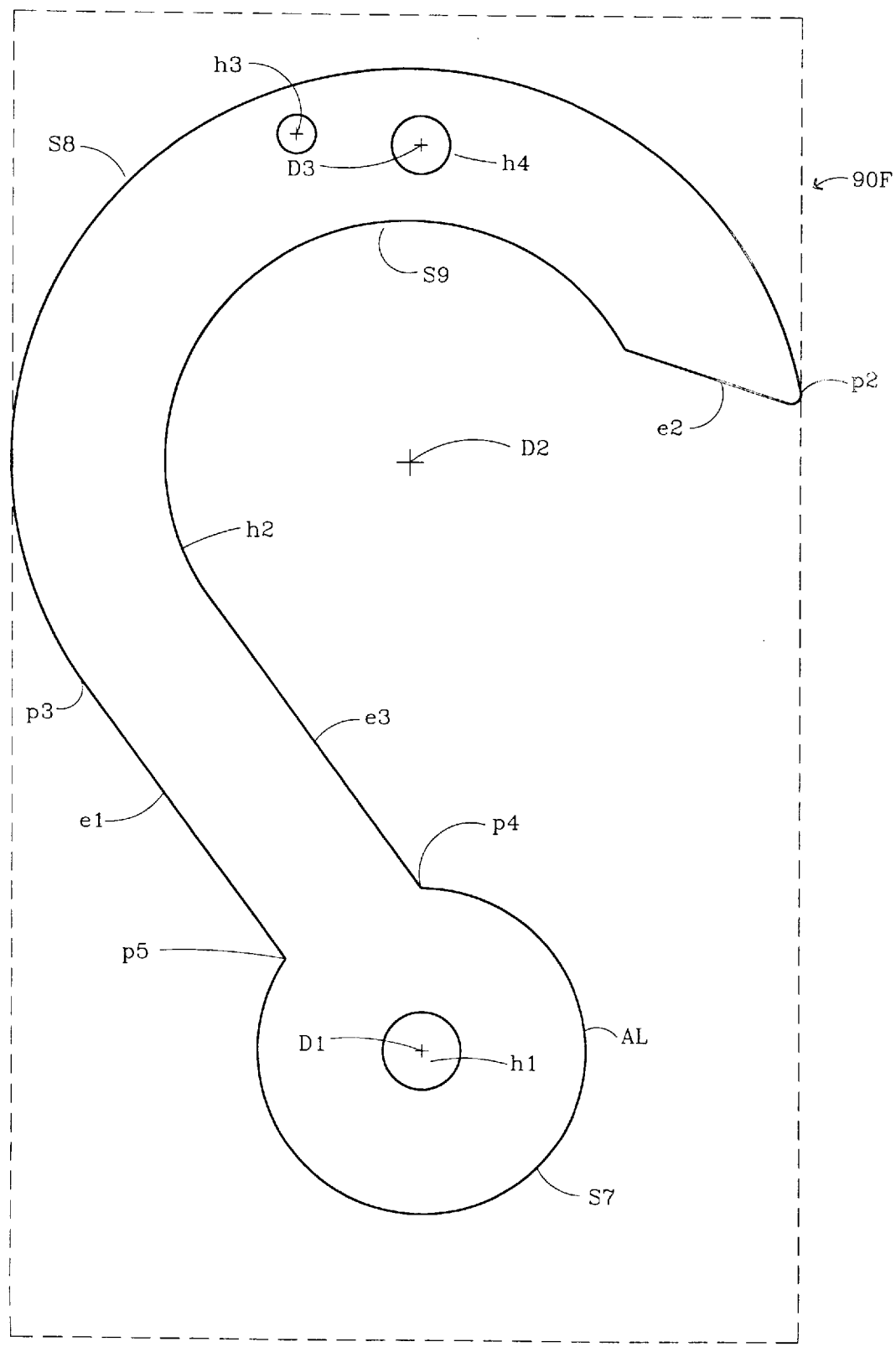
FIG. 13B is a side view of an actuator base which forms part of the latch assembly shown in FIG. 13, and seen in part in FIG. 9.

FIGS. 13 and 13A show that the cradle base 88F may be fabricated from a rectangular flat steel plate, ¼ inch thick, and 8½ inches in length and 5 inches in width. With the plate (shown in dashed lines) in FIG. 13A, lying flat and with the width sides horizontal. Starting with the lower width side and using a scribing tool (i.e., marking pen), find the lower width mid point at 2½ inches. Moving the scribing tool parallel to the 8 inch length for 1¾ inches, make a scribe point C1 at this location. Continuing along, parallel to the 8 inch length, make a second scribe point C2, 3¾ inches above the first scribe point C1. Continuing from the second scribe point C2, continue parallel with the 8 inch length, for 2 inches and make a third scribe point C3, such that the scribe points C1, C2 and C3 are generally co-aligned. At the first center point C1, scribe a radius circle 1¾ inches and bore a hole H1 at this scribe point ½ inches in diameter.

At the second scribe point C2, scribe two radius circles, one radius of 2½ inches and a second scribe of a radius of 1 9/16 inches. Bore a hole H2, at second scribe point C2, 3⅛ inches in diameter. To the right side of the plate, draw a straight edge scribe S1, from the outer diameter of the 2½ inch scribe to the outer diameter of the 1¾ inch scribe, at the farthest horizontal point of both scribes and remove this material.

Remove material from the 1¾ inch scribe, starting from the point P1, where the right straight edge S1 intersects the 1¾ scribe, clockwise to the six o'clock position of the 1¾ inch scribe, then continuing to remove material to a point P2 approximately 130 degrees from the six o'clock position, thus forming the straight edge side S1 and the cradle base 88F lower curvature BL. From point P2, remove material for ⅝ of an inch, cutting from right to left, on a 60 degree angle from horizontal of P2, thus forming straight edge E1 and point E11.

At point of E11, traveling left to right, make a cut, 35 degrees from horizontal of the point of E11, until this cut intersects the 3⅛ inch bored hole H2, thus forming a second straight edge E2. At the location of the third center point C3, scribe a counter clockwise radius circle of ½ inch from the twelve o'clock position of the 2½ inch radius scribe to the six o'clock position where the scribe intersects the 3⅛ inch bored hole H2, cut and remove this material, thus forming an asymmetrical "S" shaped edge E3. Bore a ⅜ diameter hole H3 at the third scribe point.

The actuator base 90F is fabricated using a rectangular steel flat plate, ¼ inch thick, 8½ inches in length by 5 inches in width. With the plate (shown in dashed lines) in FIG. 13B, lying flat and with the width sides horizontal. Starting with the lower width side and using a scribing tool, find the lower width's mid point at 2½ inches. Moving the scribing tool parallel with the 8 inch length for 1¾ inches, making a scribe point D1 at this location. Scribe a 1 inch radius circle S7 at this point and bore a ½ inch hole h1 at this scribe point D1 location. Continuing along the 8 inch length, scribe second point D2, 3¾ inches above the first scribe point D1. At the second scribe point D2, scribe two radius circles, one radius S8 of 2½ inches and the second radius S9 of 1⁹⁄₁₆ inches. Continuing parallel with the 8 inch length, from the second scribe point D2, continue for 2 inches and make a third center point D3, which is coaligned with the scribe points D1 and D2. Bore a hole h2, 3⅛ inches in diameter, at the second scribe point D2, creating side S9, 3⅛ inches in diameter.

Traveling on a horizontal plane, parallel with the 5 inch width, from right to left bore a hole h3 ¼ inch in diameter, ¾ of an inch from the third center point D3. Starting at the twelve o'clock position p4 of the 1 inch radius circle scribe S7, cut and remove material along the scribe S7, traveling clockwise for 300 degrees, for defining an actuator base 90F lower curvature AL. From the 300 degree position, p5, scribe a straight edge e1, at 60 degrees of horizontal of p5, to the 2½ inch radius scribe S8, intersecting at p3. Cut and remove this material, from the 300 degree position on the 1 inch radius circle S7, traveling from right to left, along the straight edge scribe e1 to the intersecting point on the 2½ inch radius circle scribe S8. Continue to cut and remove material, in a clockwise direction from the intersecting point p3 of the straight edge scribe e1 and the 2½ inch radius scribe S8, for approximately 200 degrees, to point p2. From p2 position, traveling from right to left, on a horizontal plane with D2 and a parallel plane the 5 inch width, cut and remove material on a 25 degree angle to the intersection of the 3⅛ inch bored hole h2, creating edge e2.

Returning to the twelve o'clock position p4 of the 1 inch radius circle S7, from right to left from p4, at a 60 degree angle from a horizontal plane, cut and remove material from the twelve o'clock position p4, to the intersecting point on the 3⅛ inch bored hole h2, creating e3. The edges e1 and e3 are substantially parallel and are distanced by about ⅞ of an inch.

Referring to FIGS. 9, 13, 13A, 13B and 14, the lower portion cradle base 88F, defined by lower curvature BL, is welded to the end of the riser beam 84 which was not coped. The riser beam 84 measures 50 inches in length, 3 inches in diameter and has a wall thickness of ⅛ inch. The inner spacer tube 88A, measures 1¾ inches in length, 1 inch in diameter with a ½ inch bored hole h10. Hole h10, and hole H1 of the cradle base 88F are aligned and the inner spacer tube 88A is welded on its outside diameter, of one end to the cradle base 88F.

The actuator base 90F is curved and mounted in the opposite direction, to the curvature of the cradle base 88F to facilitate the removal of the door beam 52 when the actuator base 90F is rotated clockwise. In this respect, with reference to FIGS. 13, 13A, 13B, as the actuator base 90F is rotated clockwise around the machine bolt 88B that passes through holes H3 and h4, the edge e2 contacts door beam 52, and pushes against it, and leverages the door beam 52 out of the cradle base 88. FIG. 13 shows the actuator base 90F in a closed position (in solid line) and an open position (in dashed line). The actuator base 90F remains in the open position until it is engaged by the door beam 52, whereupon, the door beam 52 forces the edge e2 in a counter clockwise rotation around machine bolt 88B, causing the actuator crank 90 to return to a closed position, for insertion of the quick release pin 90A.

The actuator crank 90 has an outer spacer tube 90B, identical to the inner spacer tube 88A. The outer spacer tube 90B also has been milled to a smaller diameter of ¾ of an inch for a distance of ¾ of an inch from the end that is not to be welded to the actuator base 90F. ⅛ of an inch from the end of the milled portion of the outer spacer tube 90B, a groove G1 is milled matched to fit a snap ring 92A. The hole h8 on the side opposite of groove G1, of the outer spacer tube 90B, is aligned with the hole h1 of the actuator base 90F and the outer spacer tube 90B is welded on its outside diameter to the actuator base 90F.

Referring to FIG. 14, the handle knob 92B, measuring 2 inches in diameter by ¾ inches thick, has a circular hole h7 in the center, measuring ¾ inches in diameter. A recess R1 is milled on one side of the handle knob 92B, measuring 1 inch in diameter for a depth of ¼ of an inch.

When latch assembly 86 is in a closed position, FIG. 13, the upper portion of the actuator base 90F and upper portion of the cradle base 88F have a circular interior cross-section, measuring 3⅛ inches in diameter, that is sized to fit the exterior cross-section of the door beam 52, measuring 3 inches in diameter.

Figure 10:
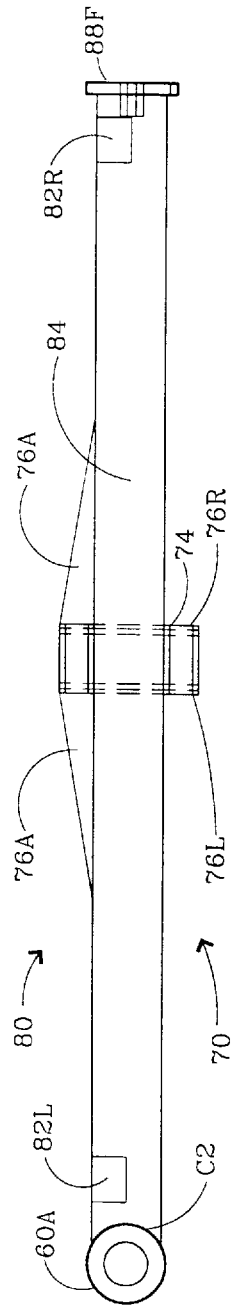
FIG. 10 is a top plan view of the assembled riser assembly of FIG. 9.
Figure 11:
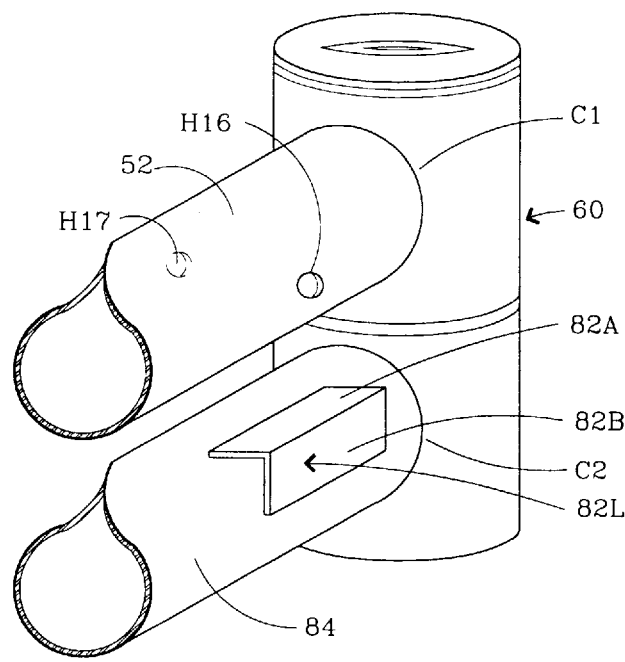
FIG. 11 is a perspective rear view of part of the riser assembly of FIGS. 9 and 10, and part of the door assembly.
Figure 15:
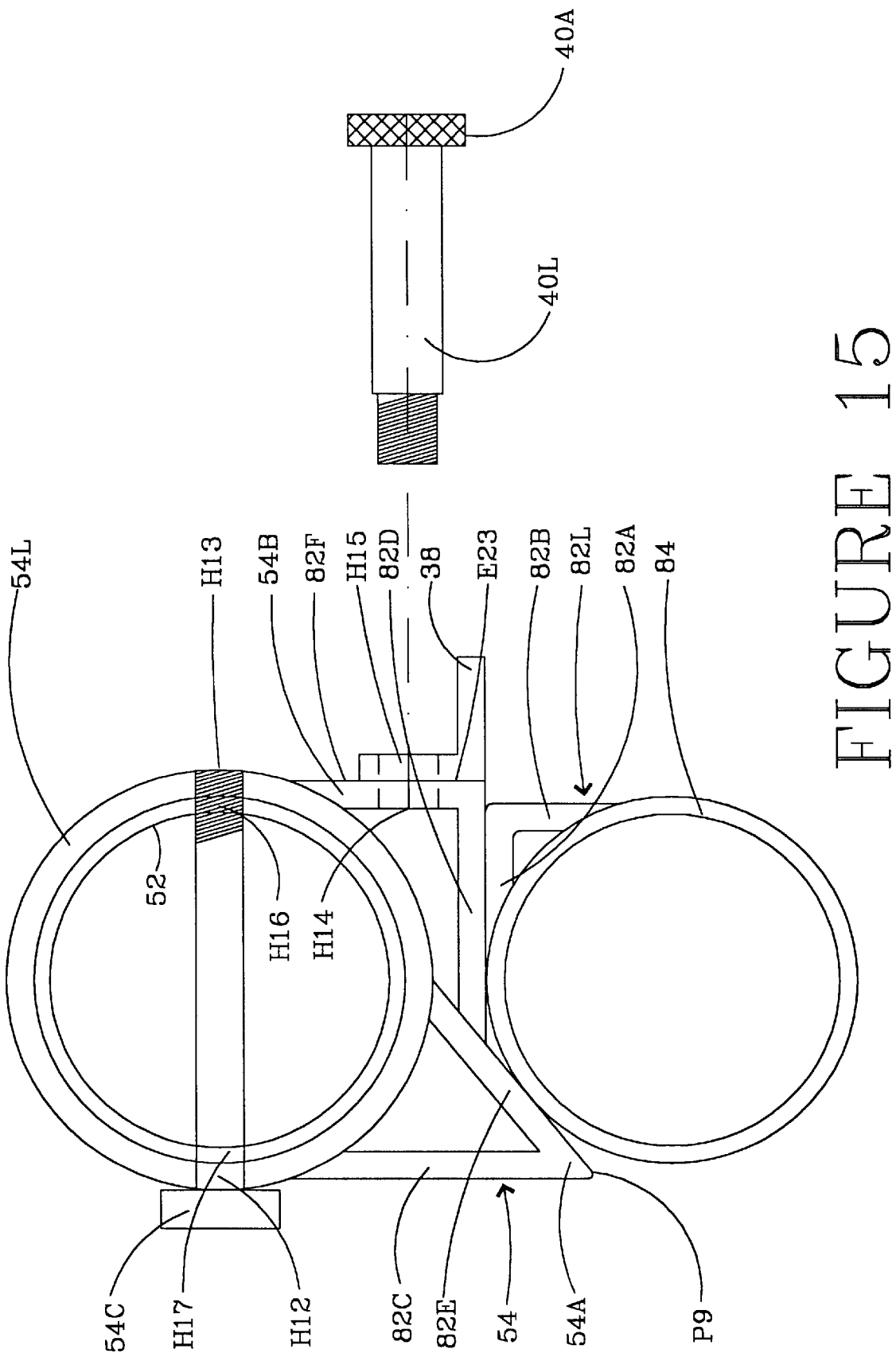
FIG. 15 is a side elevational view of a platform support sleeve and partially shown riser beam assembly, which forms part of the door assembly and riser assembly of FIGS. 11 and 12.

Referring to FIGS. 9, 10 and 15, the platform stops 82L and 82R that are positioned on the two opposite ends of the riser beam 84 are attached to the vehicle side of the riser beam 84, at about 23 inches from the center of the riser beam 84.

The stops 82L and 82R are identical in size, shape, and function, and therefore, only the stop 82L will be described in more detail. The stop 82L is approximately 3 inches long, and ³⁄₁₆ inches thick, so that each side is 1 inch in width. It is formed of two sides 82A and 82B that are angularly (i.e., 90 degrees) secured to each other. One side 82A generally extends in a horizontal plane to form a platform for an edge 36G (FIG. 25) of the platform side plate 34L, so that when the platform assembly 30 is raised to a vertical position, as shown in FIG. 4, edge 36G mates with edge 82A and holds the platform assembly 30 in a stationary vertical position when the door assembly 50 is closed (FIG. 4). The platform side plate 34R is identical in size, shape and function to platform side plate 34L.

Referring to FIG. 15, the end of the edge 82A of the platform stop 82L extends toward the vehicle, and is welded in place to the riser beam 84 at a point on the outer contour of riser beam 84. Accordingly, the end of edge 82B of the platform stop 82L will meet the riser beam 84 at a point 90 degrees from the end of the edge 82A where it has been welded to the riser beam 84. End of edge 82B is also welded to the riser beam 84.

The door assembly 50 will now be described with reference to FIGS. 1, 2, 4, and 15 through 22. The door assembly 50 includes a door beam 52 with a door cap 52A, platform support sleeves 54 and 56, sleeve spacers 58L and 58R and hinge assembly 60.

Figure 12:
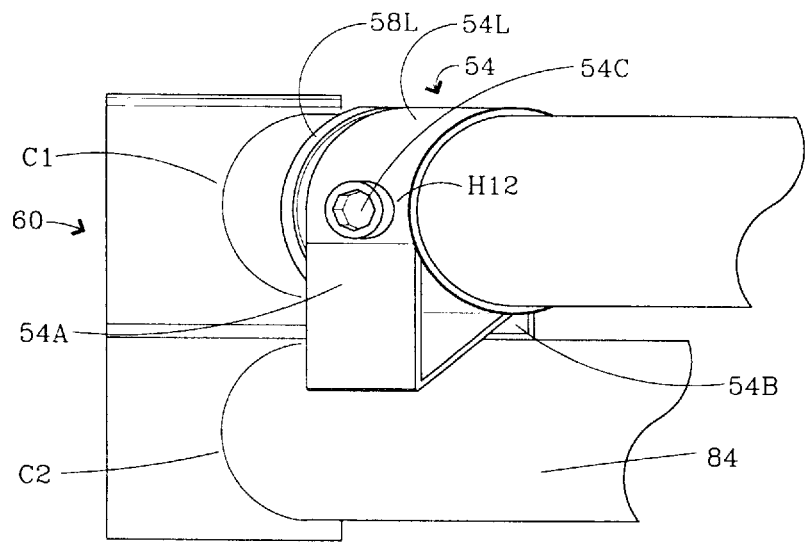
FIG. 12 is a perspective front view of part of the riser assembly of FIGS. 9 and 10, and part of the door assembly.

The hinge assembly 60 includes a hinge pivot 60A, hinge spacer 60B, door hinge tube 60C, flange bushing 60D, hinge cap 60E and tapered machine screw 60F. The identical platform support sleeves 54 (left) and 56 (right) include identical components including a sleeve 54L, 56R, front check 54A, 56A, rear check 54B, 56B, and sleeve bolts 54C, 56C, respectively. The door assembly 50 further includes a pair of identical sleeve spacers 58L, 58R (FIGS. 12, 18 and 19). For further illustration, only the left platform support sleeve 54 and the left sleeve spacer 58L will be described in detail.

Referring to FIGS. 3, 4, 12, 17, 18, 23 and 24, the sleeve spacers 58L have an internal diameter of 3 inches and a wall thickness of $3/16$ of an inch. The width is sized to fit between the platform support sleeve 54 side S9 (FIGS. 1 through 4, 12 and 17), and platform side plate 34L side S10 (FIG. 25). This enables the platform assembly 30 to remain in a fixed position, relative to the side to side movement on the door beam 52, as shown in FIG. 4. As a result, the platform assembly 30 is securely positioned on the door assembly 50.

Referring to FIGS. 1, 2, 9 through 12, 22 and 25, the door assembly 50 includes the hollow cylindrical door beam 52, measuring 50.5 inches in length by 3 inches in diameter by $1/8$ inch wall thickness. The door beam 52 may be covered at one open end with a door cap 52A, whose diameter is $2\frac{3}{4}$ inches by $1/8$ wall thickness, and welded to this end. The door beam 52 may be coped C1, on a $1^{11}/_{16}$ inch radius, at the opposite end from the door cap 52A mated to fit door hinge tube 60C. Also included are bored transverse holes H16 and H17 (FIGS. 11 and 15) $3/8$ inches in diameter, positioned to coalign with bored holes H12, H13 as shown in FIG. 15. When the platform support sleeve 54 is fitted onto the door beam 52, with hole H13 closest to the vehicle, the sleeve bolt 54C passes through holes H12, H17, H16 and is screwed into hole H13, thus securing platform support sleeve 54 to door beam 52. The platform support sleeve 54 positions the platform assembly 30 on the door beam 52. It further supports the platform assembly 30 in a horizontal position, by way of front check 54A and lower tube 36E, when the door assembly 50 is in the open position (FIG. 2). It also holds the platform assembly 30 in a vertical position, by way of platform side plate 34L edge 36G and platform stop 82L edge 82A, when the door assembly 50 is in an closed position (FIG. 4). Moreover, as it will be explained later, the rear check 54B edge 82D acts as a physical contact surface between edge 82D and the platform stop 82L edge 82A, so when door assembly 50 is closed onto the riser assembly 70, with the latch assembly 86 in a locked position, the flexing of the door assembly is minimized.

With reference to FIGS. 11, 12 and 15 through 17, the platform support sleeve 54 has a 3 inch internal cross-section by 2 inches wide by $3/16$ inch wall thickness, to slide over the 3 inch external cross-section of the door beam 52. The platform support sleeve 54L is bored transversely through its diameter at mid point of its width, holes H12 and H13. Holes H12, H13 measure $3/8$ inch in diameter. Hole H13 is tapped and is sized to fit the sleeve bolt 54C, which measures $3\frac{3}{8}$ inches by $3/8$ inches.

The left front check 54A includes an (end of) edge 82C that is welded to the sleeve 54L slightly below hole H12 and an (end of) edge 82E that is welded to the bottom contour of the sleeve 54L, at a point that is on a vertical center line of the sleeve 54L. The rear check 54B end of edge 82F is also welded to the sleeve 54L, slightly below the tapped hole H13 in the sleeve 54L. The rear check 54B is bent at a 90 degree angle toward edge 82E. The end of edge 82D is welded to edge 82E, thus providing $3/4$ of inch distance from the bottom of the door beam 52 to the top of the riser beam 84.

The front check 54A and the rear check 54B, have a width of 2 inches and a wall thickness of $3/16$ of an inch. The front check 54A end of edge 82C and the rear check 54B end of edge 82F, are welded on the left sleeve 54L in such a manner that it does not obstruct the passage of the sleeve bolt 54C through holes H12 and H13.

The front check 54A is bent at point P9, which is about $3\frac{1}{4}$ inches from the center line of hole H12, at approximately a 130 degree angle. The end of edge 82E is cut, material removed and welded in place on the outer contour of sleeve 54L, where it intersects the bottom of the sleeve 54L.

Figure 3:
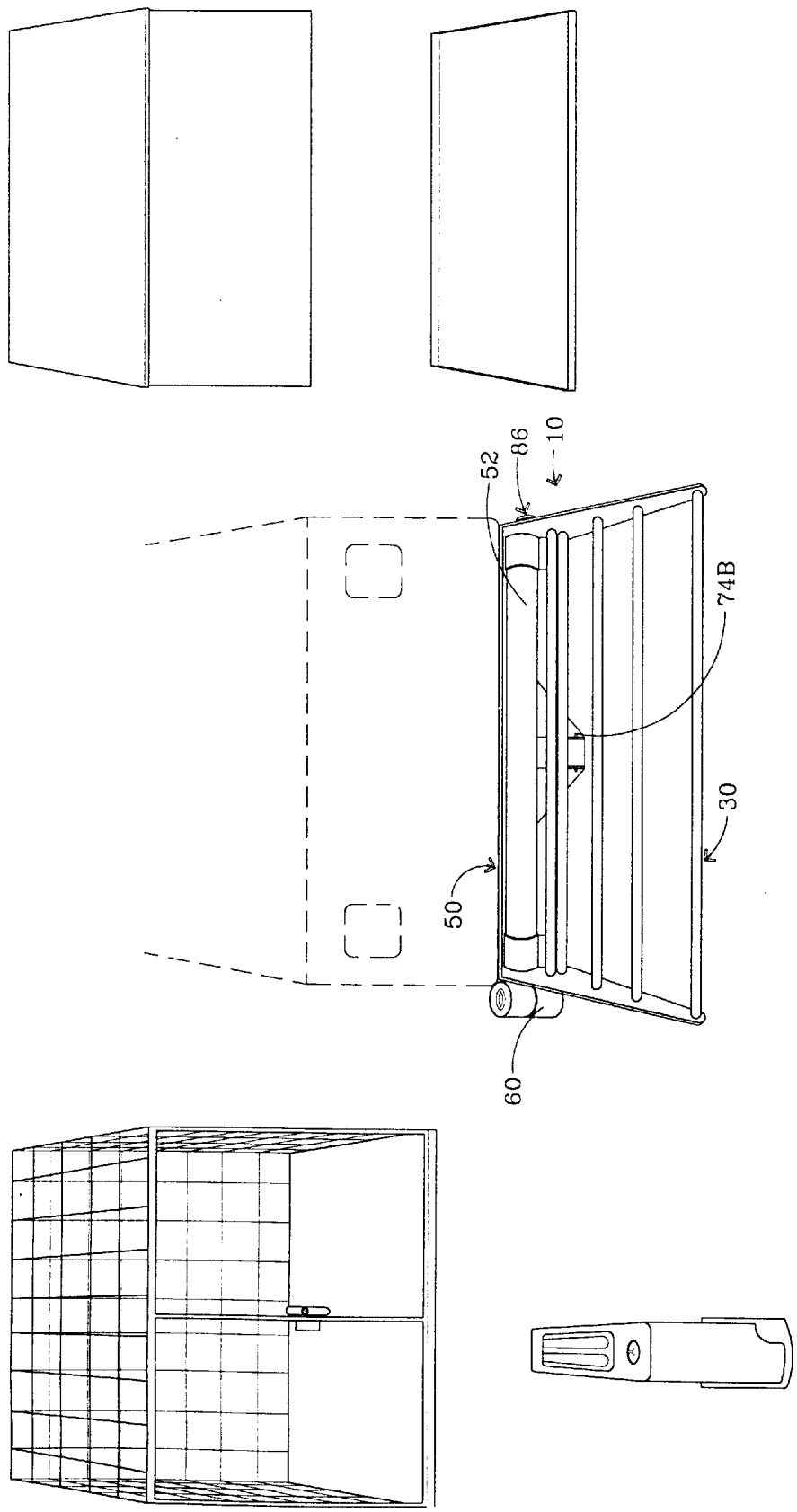
FIG. 3 is a front view of the carrier of FIGS. 1 and 2 shown in a fully extended, closed horizontal position, and ready to be loaded with a variety of accessories such as a cargo cage, a cargo chest and tray, and a gas can.

When the platform assembly 30 is in the horizontal position (FIGS. 2 and 3), the edge 82E comes in physical contact with the riser beam 84. This gives the door assembly 50 and riser assembly 70 the ability to support the weight of the platform assembly 30, and its cargo, regardless if the door assembly is in the open position or closed position (FIGS. 2 and 3). This is made to happen by means of the lower tube 36E coming in physical contact with edge 82C, and to be explained in further detail later. With particular reference to FIG. 3, the cargo may include, for instance, a cage 101, a gasoline can 102, a chest 103 and/or a base tray 104.

This is also the feature that allows the cargo to remain in place on the carrier 10 when the door assembly 50 is opened for an unobstructed access to the rear of the vehicle 12. Additionally, this feature also creates a second means of support of the platform assembly 30, on the door assembly 50, when the door is closed. The primary means of support of the platform assembly 30 on the door assembly 50, when the door assembly 50 is closed, will be discussed later.

Referring to FIG. 15, there is a $3/8$ inch drilled and tapped circular hole H14, at mid point on edge 82F of the rear check 54B, which is made to accept knob bolt 40L, which is dimensioned 2.5 inches in length by $3/8$ inches in diameter. Another hole (not shown) that is identical in size, shape, function and construction, applies to the right rear check 56B.

Rear check 54B, when installed on the door beam 52, by way of being part of platform support sleeve 54, sized to match the positioning of the hole H15 in a platform brake 38 (FIGS. 15 and 23 through 25) that forms part of the platform assembly 30. The hole H15 is circular and is dimensioned to accept knob bolt 40L. Right knob bolt 40R is identical in size, shape, function and construction of left knob bolt 40L. Installation of the knob bolt 40L, through the platform brake 38 hole H15, and screwed into the rear check 54B hole H14, allows the platform assembly 30 to remain fixed in the vertical position, when the door assembly 50 is opened. Thus, providing the ability of the device to open and close without removing the carrier from the vehicle 12 for an unobstructed access of the vehicle 12 (FIG. 1).

Figure 22:
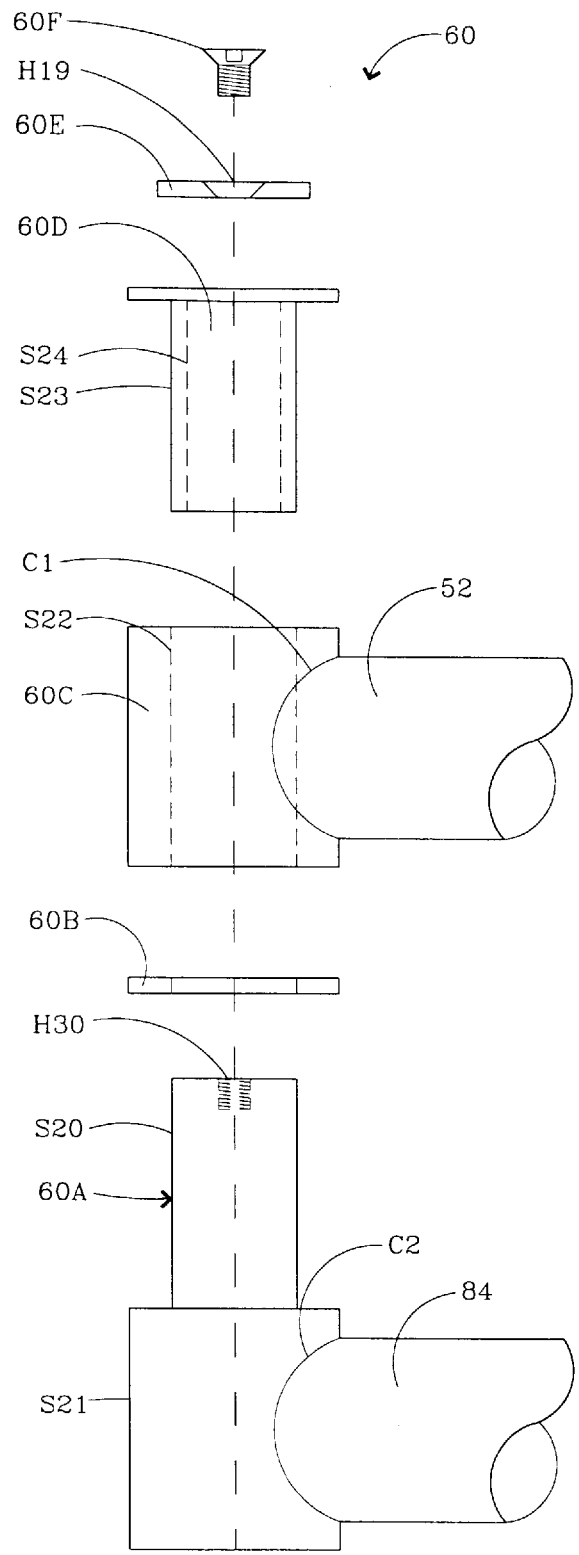
FIG. 22 is a exploded front elevational view of the hinge assembly which forms part of the door assembly and riser assembly of FIGS. 1, 2, 3, 4, 11 and 12.

The door assembly 50 also includes a hinge assembly 60. As illustrated in FIG. 22, the hinge assembly 60 includes a hinge pivot 60A, a hinge spacer 60B, a door hinge tube 60C, a flanged bushing 60D, a hinge cap 60E and a tapered machine screw 60F.

The riser beam 84 is coped C2 (FIGS. 9 through 12 and 22) in a similar fashion as was described earlier for C1, on the end opposite the latch assembly 86, to mate a solid cylindrical bar, 7 5/16 inches long by 3 3/8 inches in diameter, which once machined becomes hinge pivot 60A. The machined portion S20 of solid cylindrical bar measures 4 1/16 inch in length by 2 inches in diameter. Centered in the cross-section of the 2 inch machined portion S20, of the hinge pivot 60A, a hole H30 is bored and tapped and sized to fit the threads of the tapered machine screw 60F, measuring 3/4 inch long by 7/16 inch diameter. The section of the hinge pivot 60A that was not machined S21, measures 3 1/4 inches long by 3 3/8 inches in diameter, is centered to and welded to the coped end C2 of the riser beam 84 (FIGS. 9–11 and 22). The door hinge tube 60C, measuring 3 1/4 inches long by 3 3/8 inches in diameter by 2 3/8 inch internal diameter is cut to length. The door beam 52 having been coped C1, is centered and welded to the door hinge tube 60C at C1 (FIGS. 9–11 and 22). To the opposite end of the door beam 52, the door cap 52A, measuring 3 1/8 inches in diameter by 1/8 inch wall, is centered and welded to the door beam 52, as described earlier. The hinge spacer 60B, measures 3 3/8 inch external diameter by 2 inches internal diameter by 5/8 inch thickness, is made from oil impregnated bronze. The flanged bushing 60D, also made from oil impregnated bronze, has an internal diameter S24, measured to fit the 2 inch diameter S20 of the hinge pivot 60A, and outer diameter S23 of flanged bushing 60D is sized to fit the 2 3/8 inch internal diameter S22 of the door hinge tube 60C. The flanged bushing 60D length is 3 1/4 inches and whose flange has an outer diameter of 3 3/8 inches and a thickness of 1/4 inch.

The hinge cap 60E measures 3 3/8 inches in diameter by 1/4 inch thickness. A circular hole H19 is bored through the center of the diameter of the hinge cap 60E, and is sized to fit the external diameter of the tapered machine screw 60F. The hole H19 is counter sunk sized to fit the taper, of the tapered machine screw 60F. A tapered machine screw 60F is sized at 3/4 inches long by 7/16 inches in diameter, to fit the threaded hole H30 in the hinge pivot 60A.

With the door hinge tube 60C attached to the door beam 52, the flanged bushing 60D is inserted into the door hinge tube 60C, as illustrated in FIG. 22. With the hinge pivot 60A attached to the riser beam 84, the hinge spacer 60B is inserted onto the hinge pivot 60A, and door hinge tube 60C is inserted onto the hinge pivot 60A. The hinge cap 60E is installed on the hinge pivot 60A, encapsulating the entire assembly, and finally, the insertion of the tapered machine screw 60F through the hole H19 in the hinge cap 60E and tightened into hole H30, completes the assembly process. This enables the user, smooth, reliable performance of the hinge assembly 60 for an unobstructed access of the rear of the vehicle, while providing a safe and secure means of attachment of the door assembly 50 to the riser assembly 70.

The platform assembly 30 will now be described with reference to FIGS. 15, 20, 21 and 23 through 25. The platform assembly 30 includes a left side plate 34L and right side plate 34R, side plate connecting tubes 36A, 36B, 36C, 36D and 36E, platform brake 38, and knob bolts 40L, 40R. All left and right components are identical in size, shape, function and construction. For this discussion the left side will be discussed.

The side plate 34L is a flat plate, resembling a right-angled triangle, measuring about 25 3/4 inches in length by 6 5/8 inches in width (at its widest point) and 0.5 inch in thickness.

A plurality of hollow, cylindrical, rigid tubes, 49 inches in length by 1 1/8 inches in diameter interconnect the left and right side plates, 34L and 34R. The side plate connecting tubes 36A, 36B, 36C, 36D and 36E, are welded in place after insertion into holes H40/h40, H41/h41, H42/h42, H43/h43 and H44/h44, as well as the aluminum platform brake 38.

The platform brake 38, measures 48 inches in length, shaped as an "angle iron". It has sides of equal dimension and perpendicular to each other, forming a right angle of 1 inch (side E21) by 1 inch (side E22) by 1/4 inches thick. The platform brake 38 is attached to the side plates 34L, 34R at points p20 and p21, so that the edge 36I is parallel to and flush with edge 36G, and the inside edge E21, of the platform brake 38 is parallel to edge 36H, and edge E20 is flush with edge 36H. In this position, the ends of the platform brake 38, where contacting S10 and S11 are welded to side plates 34L and 34R.

Figure 23:
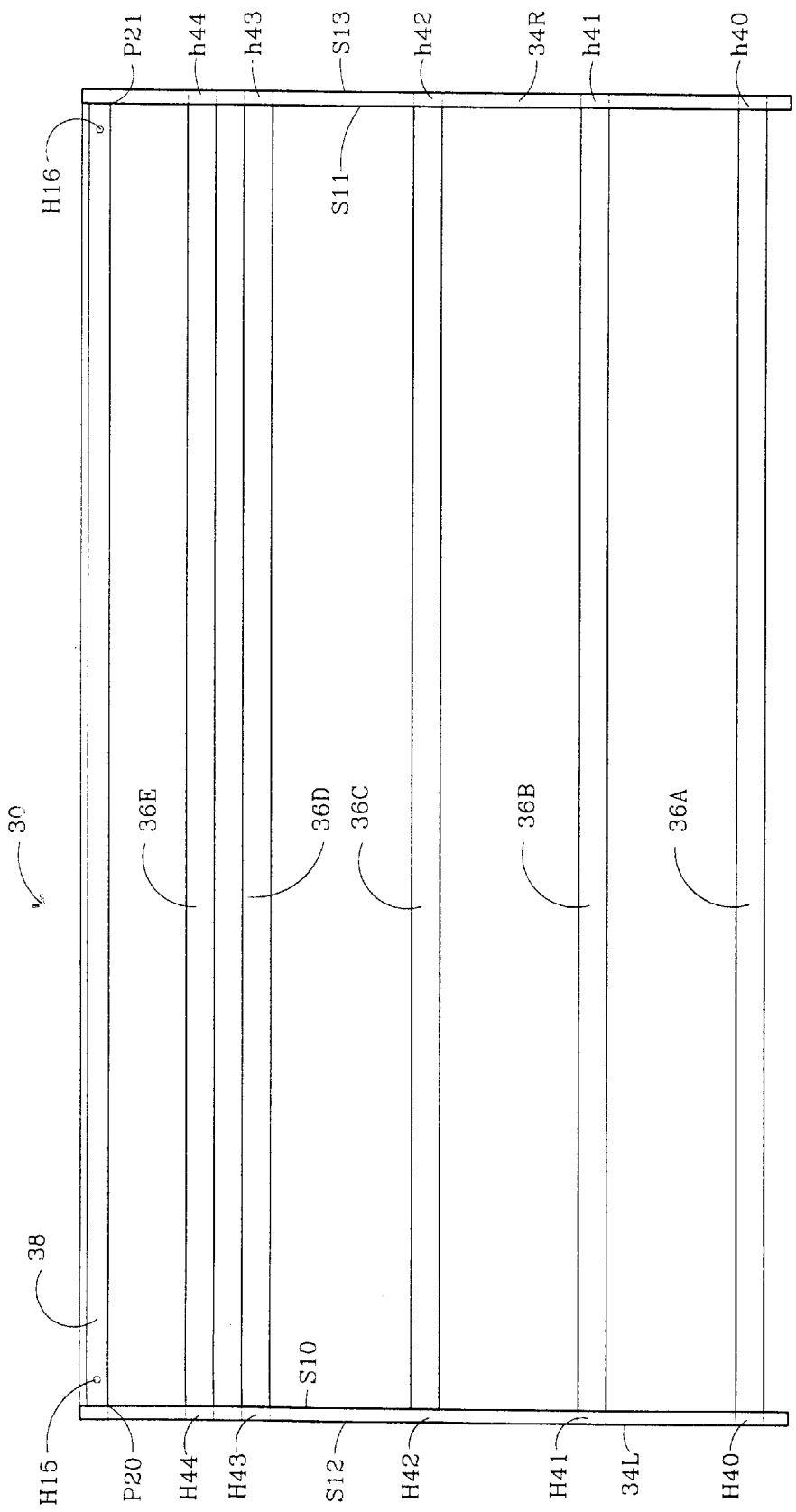
FIG. 23 is a top view of a platform assembly which forms part of carrier 10 of FIGS. 1, 2, 3 and 4.

Referring to FIGS. 15, 23 and 25 holes H15 and H16 are made by drilling two 3/8 inch holes at the locations, 1 inch from the side S10 and S11, and in the center line of the width of edge E21. Holes H15 will coalign with threaded hole H14 on rear check 82F, to accept insertion of knob bolt 40L, (right side not shown, but identical in size, shape, function and construction).

The knob bolt 40L (right side not shown) is inserted through the platform brake 38 hole H15 of the platform brake 38, and threaded into the rear check 54B hole H14, enabling the platform assembly 30 to remain in a vertical position when the door assembly 50 is opened (FIG. 1), and provides simple and easy use of hardware that is commonly used by the lay person, by way of the knurled end 40A of the knob bolt 40L.

Figure 24:
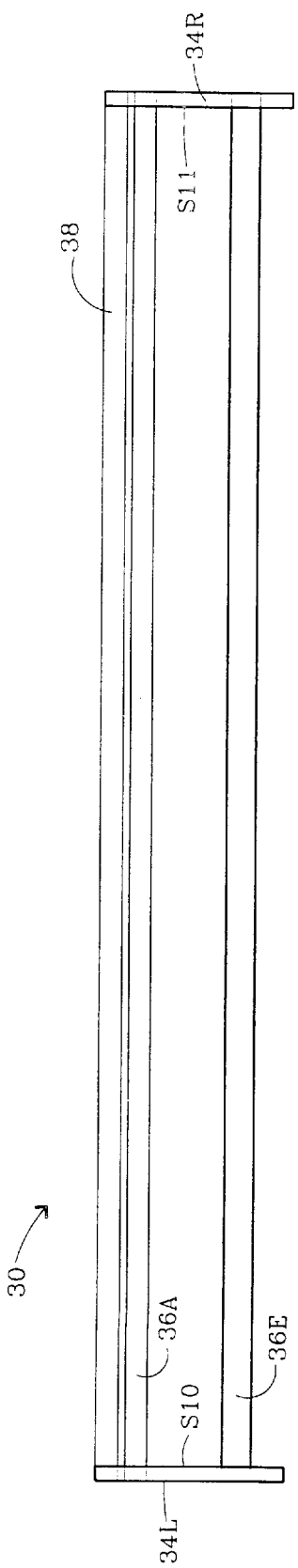
FIG. 24 is a front view of a platform assembly which forms part of carrier 10 of FIGS. 1, 2, 3 4, and all of FIG. 23.
Figure 25:
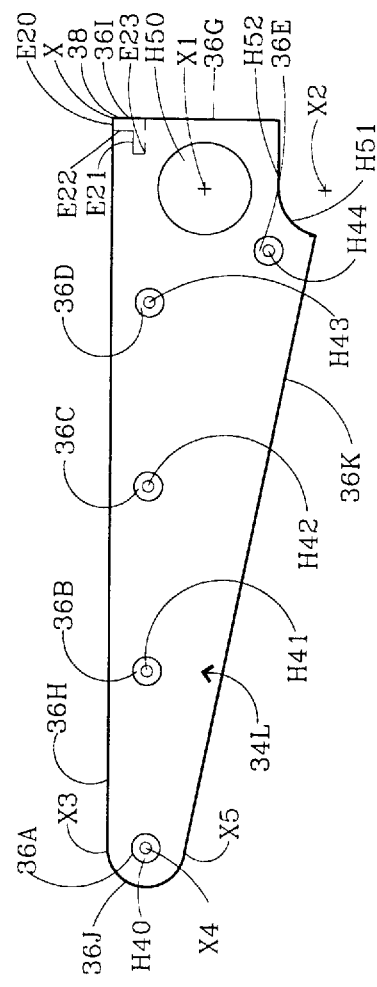
FIG. 25 is a side view of a platform assembly which forms part of carrier 10 of FIGS. 1, 2, 3, 4, and all of FIGS. 23 and 24.

Referring to FIGS. 23 through 25, four circular holes H40, H41, H42, and H43 (right side not discussed), each measuring 1 1/8 inches in diameter, are made through the side plate 34L and 34R, 6 inches on center starting from edge E22 of platform brake 38 (FIG. 25) and 1 9/16 inches from the edge 36H to the center of the hole H40, H41, H42 and H43.

Referring to FIGS. 23 and 25, position of hole H44 is determined after the platform assembly 30 is attached to the door assembly 50, in the horizontal position (FIG. 3), and with the latch assembly 86 closed and locked by quick release pin 90A (FIG. 14). Scribe a hole H44, 1 1/8 inches in diameter, on side plate 34L side S10 so that the scribe mark should come in contact with front check 54A edge 82C (FIGS. 12, 15 and 16). A 1 1/8 inch diameter hole H44 is then made and lower tube 36E is inserted in hole H44 and welded. Observe if the lower tube 36E is in contact with the front check 54A edge 82C at the same time as hole H51 on side plate 34L is in physical contact with the outer contour of the riser beam 84, as seen in FIG. 3. When the platform assembly 30 and the door assembly 50 is opened (FIG. 2), H51 (FIG. 25) will disengage from the outer contour of the riser beam 84, and the platform assembly 30 will "drop" until the lower tube 36E comes in physical contact with the front check 54A edge 82C. There should be simultaneous contact of the lower tube 36E with front check 54A edge 82C when H51 is in contact with the outer contour of riser beam 84, when the platform assembly 30 and the door assembly 50 are closed (FIG. 3) and the latch assembly 86 (FIG. 13) is closed and locked with quick release pin 90A.

All the side plate connecting tubes 36A, 36B, 36C, 36D and 36E can be tapped in the ends of their internal diameter to accept the thread of a 5/8 inch bolt, for attaching a number of accessory mounts, such as accessory mounts for bike racks 150, ski racks 152, gas cans, carrying cage, cargo chest, carrying tray, fishing poles, snow board, surf board, wheel chair, tool chest, mobile cook top oven, ice chest, lawn mower, to name a few (shown in exploded view in FIG. 4).

Referring to FIG. 25, begin with a flat rectangular aluminum sheet 26 inches in length by 8 inches in width by 0.5 inch thick, lying flat with the length sides horizontal, using a scribe tool, the top horizontal side becomes edge 36H of the side plate 34L and the right edge becomes edge 36G. From point X, traveling along side 36H for 24 inches, scribe a point X3, then traveling perpendicular to side 36H for 1$\%_{16}$ inches, mark a scribe point X4. Scribe a line from X3 through X4 for 5 inches. From X4, scribe a counter clockwise 1$\%_{16}$ inch radius circle 36J, starting at X3, until it intersects the scribe line from X3 through X4 for 5 inches, this intersecting point becomes X5.

Starting at point X, traveling horizontally 2¼ inches, from right to left along side 36H, and then proceeding 2¾ inches parallel with side 36G, make a mark X1 and scribe and bore a hole H50 3.005 inches in diameter. Continuing, travel 2¼ inches from point X1, parallel with side 36G, and scribe a point X2. Scribe a line from point X1 to point X2 and scribe a line from point X5 to X2. At point X2, scribe and bore a hole H51 3.005 inches in diameter. Cut and remove material along scribes 36J and 36K. Traveling from left to right, parallel to side 36H, from the intersection point of H51 and the scribe line from X1 to X2, cut and remove material along this line to side 36G, creating side H52. The bottom of circular hole H50 and the top of circular hole H51 at side H52, should be distanced apart by about ¾ inch.

Refer to FIGS. 2, 3 and 25. With the platform assembly 30 installed to the door assembly 50, hinge assembly 60 and riser assembly 70, as a complete unit, and with the latch assembly 86 in a closed position, the circular hole H50 and the circular hole H51 are also positioned to fit, relative to the side 36G, so when the platform assembly 30 is raised into the vertical position on the door beam 52, the side 36G (FIG. 25) makes physical contact with edge 82A of the platform stop 82L (FIG. 15). The rear check 54B, edge 82F (FIG. 15) makes physical contact with edge E23 (FIG. 25), of the platform brake 38 and hole H14 of the rear check 54B coaligns with the hole H15 of the platform brake 38, allowing for the insertion and securing of knob bolt 40L, through hole H15 and tightened into hole H14. Both of these features further support the platform assembly 30 in a securely fixed and vertical position when the platform assembly 30 and door assembly 50 are in an open or closed position on the riser assembly 70.

With the platform assembly 30 installed to the door assembly 50, hinge assembly 60 and riser assembly 70, as a complete unit, the circular hole H50 and the circular hole H51 are also positioned to fit, relative to the door beam 52 and the riser beam 84. When the latch assembly 86 is in the closed position, the remaining portion of the circular hole H51 rests upon the outer contour of riser beam 84 for maintaining the platform assembly 30 in a horizontal position. This is the primary means of support for the platform assembly 30 when the door assembly is closed. This innovative use of circular holes H50 and H51 enable the platform assembly 30 to be supported by the door beam 52 and the riser beam 84, together, when the carrier 10 is in a closed position. This design provides a safe and secure means of transporting cargo under dynamic conditions as the vehicle is traveling under the normal conditions and speeds that exist on our roadways today.

Figure 26:
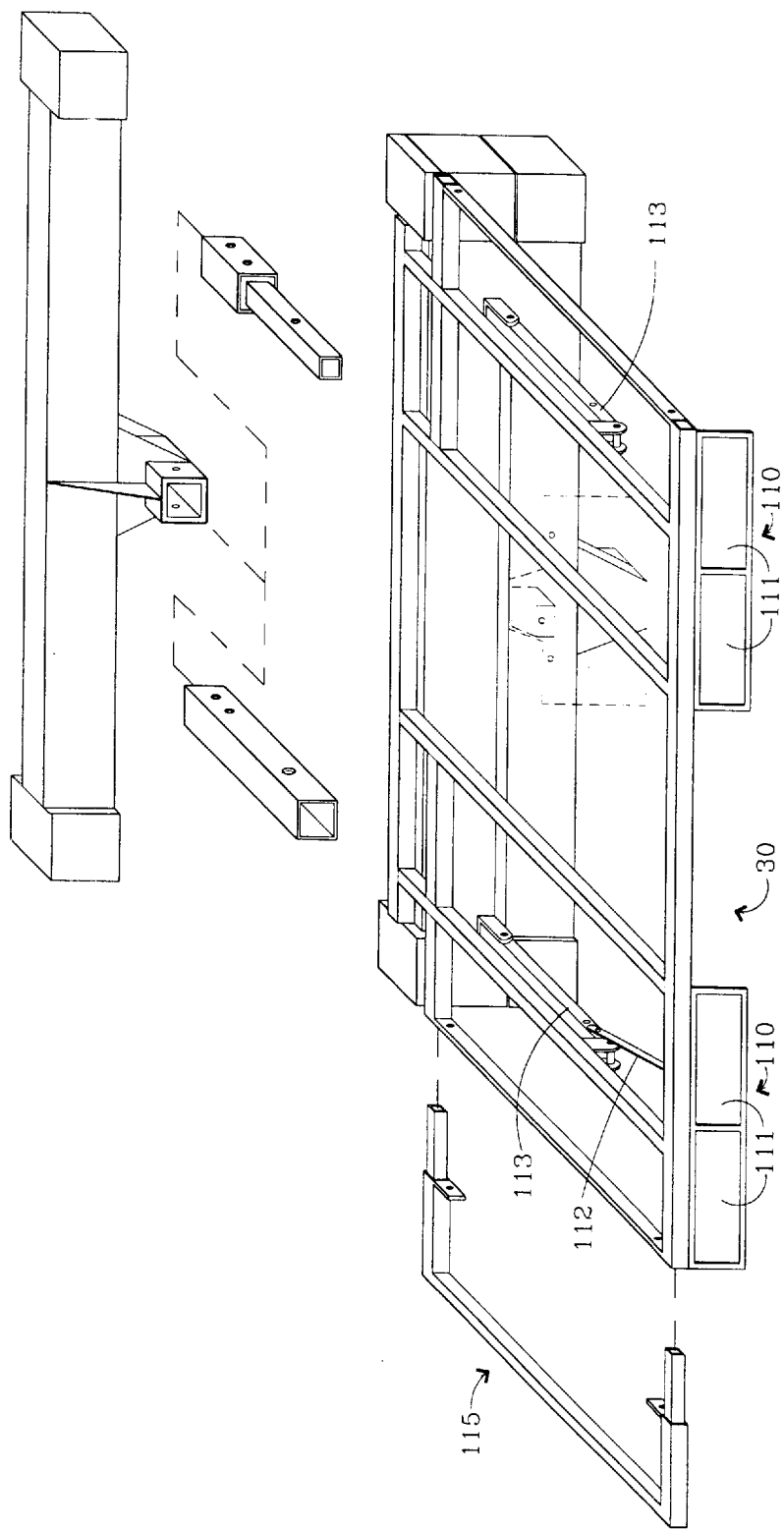
FIG. 26 is an exploded view of another embodiment according to the present invention.
Figure 27A:
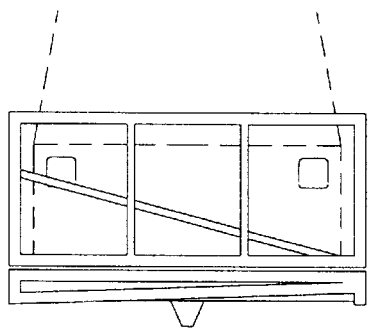
FIG. 27 represents four views of yet another embodiment according to the present invention.
Figure 27C:
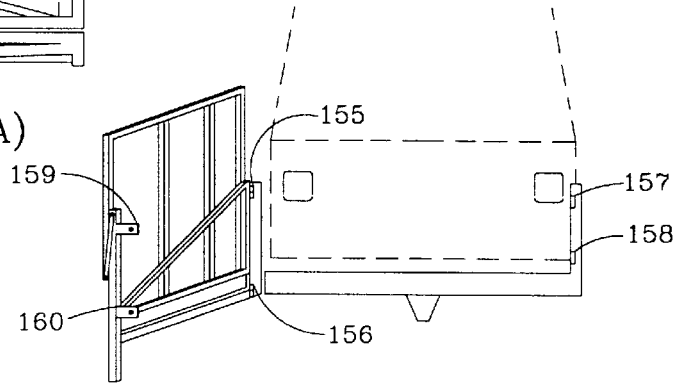
Figure 27B:
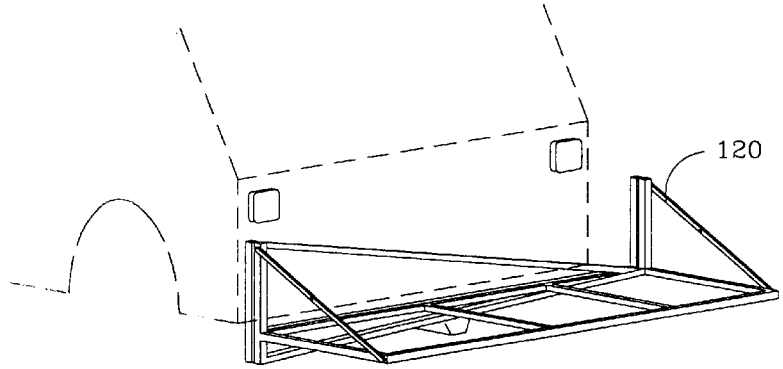
Figure 27D:
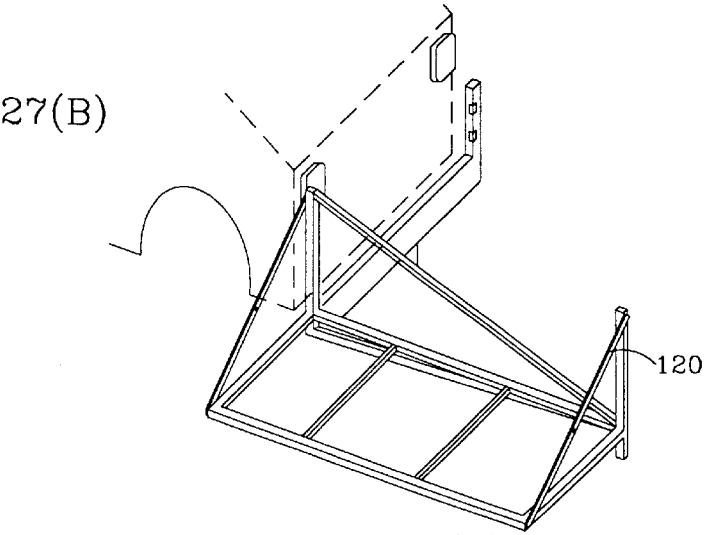
Figure 28:
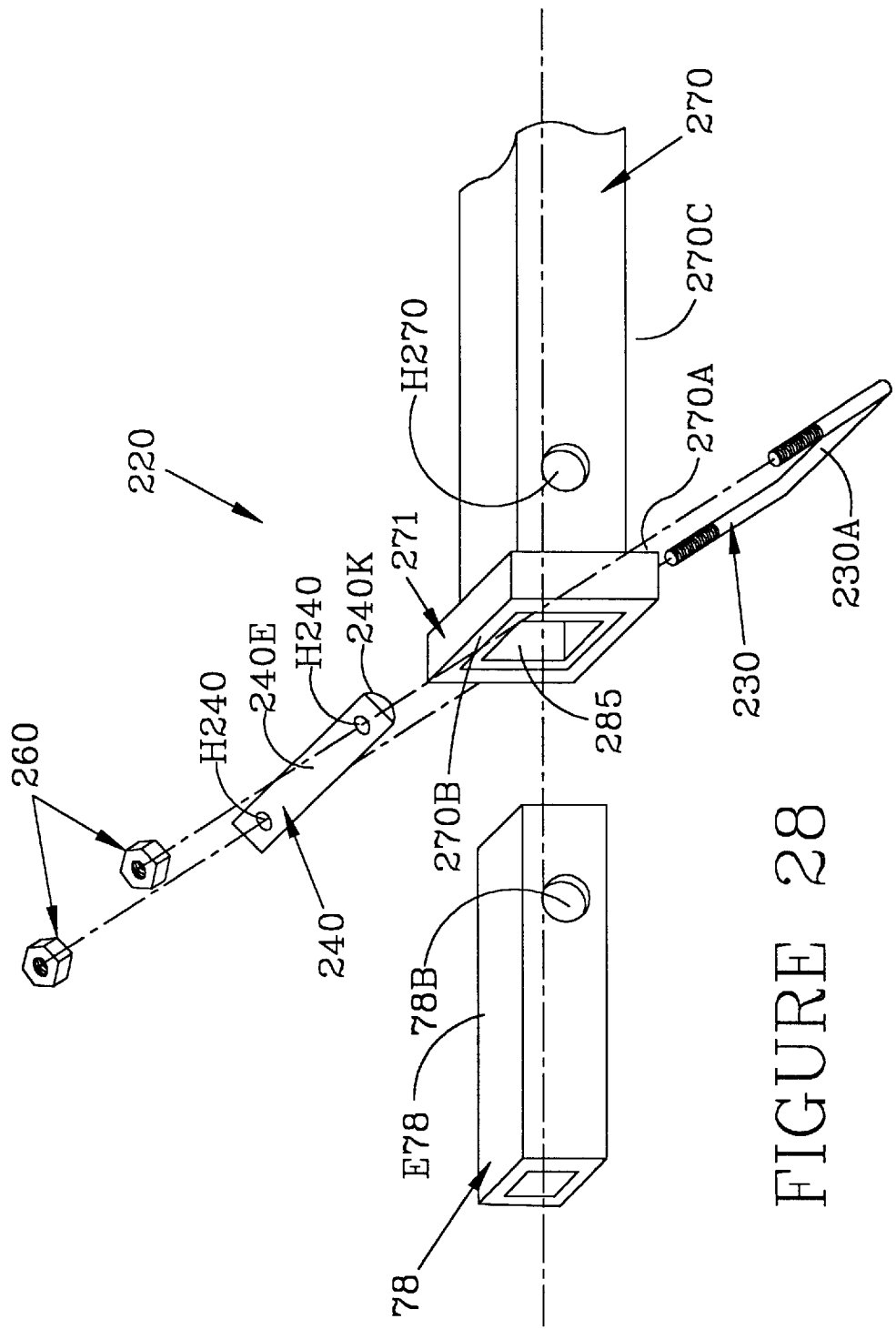
FIG. 28 is an exploded perspective view of a clamp according to a preferred embodiment of the present invention.

FIG. 26 illustrates another embodiment according to the present invention. This embodiment is somewhat similar in appearance to the preferred embodiment described above. However, there are some differences. An integrated tail light system 110 is included in the embodiment shown in FIG. 26, with the additional function that allows a plurality of lights 111 to "swing" via a linkage 112. This enables the lights 111 to be facing rearward, regardless if the platform assembly 30 is in the horizontal or vertical position. Also, there are not formed members in the design, all components are based on a "cut and fit" philosophy. Also, a "standard" hinge (not shown) is used in lieu of the "hole and tube" (i.e., H50, H51 in FIG. 25) design used in the preferred embodiment, to raise and lower the platform. FIG. 26 shows a "leaf" attachment 115 which is used to increase the width of the platform assembly 30. This embodiment also uses "stays" 113 to support the platform from beneath, wherein the preferred embodiment uses a cutout on the bottom of the platform assembly side plate 34L sides H51 and H52 to engage the riser beam to support the platform assembly 30. The alternative embodiment uses square tubing rather than round tubing as in the preferred version. Note that any material could be used, as long as it has the structural characteristics to hold specific loads. The carrier further includes a pair of telescoping "stays" 113 that support and secure the platform assembly 30 in either the horizontal or vertical position. Also pivotally connected to the stays 113 is a pair of light linkages 112, to allow the lights 111 to swing via the linkages 112 enabling the lights 111 to face rearward regardless if the platform assembly 30 is in the horizontal or vertical position.

Referring to FIG. 27, it shows yet another embodiment comes from the standard practice of making a gate. This version has one or more "stays" 120 that support the platform assembly 30 from above the platform assembly 30. These stays 120 perform the same or similar function to that of hole H50 and hole H51 and hole H52 of side plate 34L of platform assembly 30, when installed on door beam 52 and riser beam 84 when the door assembly 50 is in the closed position. The front check 54A of platform support sleeve 54, in conjunction with lower tube 36E perform the same or similar function as that of the stays 120, when the door beam assembly 50 is open. Also this version uses two small hinges 155, 156 for the door opening function, and uses two latches 157, 158, 159, 160 rather than one to lock and unlock the door assembly 50. This unit uses square tubing, rather than round. This version uses a standard hinge to raise and lower the platform assembly 30, rather than the unique feature of the preferred embodiment, wherein the platform assembly hole H50 encompasses the door beam 52 allowing the platform assembly 30 to swivel around the door beam.

The vehicle itself could contain, or have the ability to be modified to contain, an alternative embodiment, that resembles the form, function, operation and/or utility of the preferred embodiment. Whereby, the user could access the device, very similarly to the procedure used to access a bed in a sofa bed, and the basic alternative embodiment remains with the vehicle. Accessory devices could be removable, as in the preferred embodiment.

The dimensions of the platform assembly 30 of 24"×48" are not absolute. The platform assembly 30 could range from 12"×36" to 24"×60", with the current single center hitch. However with other mounting possibilities, dimensions other than those above could be experienced.

Another alternative embodiment, in lieu of a hinge assembly, would be to construct a sliding track, similar to a sliding track in a bureau drawer. The platform assembly/door assembly, as seen in the preferred embodiment, for example, could be combined into a less complex and weight reducing unit. The assembly would travel to one side or the other, for access to the rear of the vehicle.

Forms of multiple attachments, or multiple receiver hitches could be utilized to stabilize the platform assembly/door assembly by reducing the complexity, size and weight of the riser assembly.

Another alternative could be to manufacture the riser assembly 70 as a bumper unit with a hinge, or some other device capable of moving a load away from the vehicle. The riser assembly as a bumper, would allow for a "plug and play" effect. If a hinge were part of the alternative design, the platform assembly/door assembly could be installed and removed, via the hinge having a release feature, for storage off the vehicle.

Also the riser assembly 70 could be eliminated if a mounting attachment was designed to mount the door assembly/platform assembly to the frame or body of the vehicle.

The height of the unit, relative to the horizontal plane of the receiver hitch could be altered.

In some cases receiver hitches are not incorporated into a draw bar, but rather the receiver hitch is mounted to the bumper or body of a vehicle.

In still another alternative, the device could have hinge/latching capabilities, all in one. Wherein, the hinge also functions as a latch mechanism, as well, allowing the user to open the device to the left or to the right at will. In addition to this, if a hinge/latch were designed, one could be able to choose to open the door assembly either left or right depending on the users conditions at the moment. In the preferred embodiment, left or right opening capabilities has to be determined prior to construction.

An alternative could be mounted to the top (anywhere) of the vehicle.

An alternative could be designed where the width of the platform could be adjusted at will, similar to a sliding leaf dining room table.

Still another alternative embodiment would be to incorporate a cargo chest of sufficient structural strength that it could perform the same function as the preferred embodiment's platform assembly/door assembly. In addition the cargo chest sides, front, back and top could be removed, leaving a carrying tray for a carrying bed.

The vehicle body or frame could be used to mount an alternative design.

Another possible alternative to the preferred embodiment, would allow the alternative embodiment to "drop" down to ground level, or lift the load above an average user's height, to afford access to the rear of the vehicle.

Materials other than that indicated in the preferred embodiment could be used. Hollow tubes constructed of plastic or other light weight composite materials, could be injected with structural foam, increasing their structural strength and decreasing weight. Titanium and Chromium-molybdenum, are two others that could be appropriate choices at this time for structural components. Carbon steel can be anodized and hardened to achieve the structural requirements of the preferred embodiment.

Materials other than bronze could be used for bushings. Needle bearings, roller bearings are two examples.

Hardened steel, and alike, could be substituted for stainless steel to manufacture a hinge pin.

A hinge could be manufactured, wherein two pieces, one resembling a "hinge knuckle" and the other a hinge pin connected to a door assembly. The "hinge knuckle" would be a sealed pressurized container having a sealable opening on one end, wherein the hinge pin is partially contained. The hinge pin would be supported by the gas charge, creating a hinge that would be very frictionless.

Another possible embodiment to increase or decrease ground clearance, would come in the form of mechanical, hydraulic, or pneumatic means of regulation. This method adjustment could also apply to the rearward clearance of a device from a vehicle.

Extrusions, stamping, drop forging, are examples of, but not necessarily all the examples of, ways to manufacture the pieces of the alternative embodiment.

With the correct structural properties, an injection mold process can be one alternative to manufacturing components from appropriate materials.

The alternative embodiment could be of any color or texture.

Alternative uses for the product could go beyond the recreational user. The invention could be outfitted with a cargo chest modified for cooking purposes for on site events.

The invention can be modified for the movie industry, wherein the platform assembly could be used to carry a remote or manned camera.

Taxi cab/passenger shuttle services can use the invention for additional cargo.

Emergency services units could utilize this invention, whereby emergency supplies are stored in a cargo chest and instantly available for placement at some remote site.

FIGS. 5, and 28 through 32 illustrate vehicle draw bar locking clamp 220 which is made according to a preferred embodiment of the present invention. The clamp 220 generally includes a square bend U-bolt 230, a bar 240, and two locking style nuts 260. In this particular example the components are generally made of carbon steel; however, higher grade materials, such as stainless steel, could also be used for greater strength. While the clamp 220 is described herein in connection with a vehicle draw bar and receiver hitch, it should be clear that the clamp 220 can be used in various other applications in addition to vehicles, including but not limited to any application where two tubes and/or bars are telescopically connected. In addition, reference to a bar 240 and to a square bend U-bolt 230 is made for the purpose of illustration only. It should be clear to a person of ordinary skill in the field that alternative devices may be used provided they perform a similar or equivalent function of wedging the draw bar (or insert) 78 and the receiver hitch (or receiver tube) 270. Wherefore, the terms "U-bolt" and "bar" may also referred to herein as first wedge and second wedge, respectively.

Figure 5:
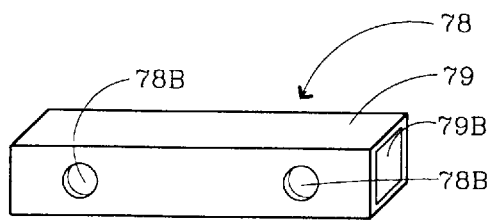
FIG. 5 is a perspective side elevational view of a first design for a receiver insert tube forming part of the riser assembly of the carrier shown in FIGS. 1 through 4.

With further reference to FIG. 5, standard hardware is used for the square bend U-bolt 230 and the locking style nuts 260, in assembling the clamp 220. In this example, in order to clamp or lock a standard 2 inch receiver hitch 270, with a corresponding 2 inch draw bar 78, two $\frac{3}{8}$–16 nylon stop nuts 260, optionally $\frac{3}{8}$ inch flat washers (not shown), and one square bend U-bolt 230 are used.

The square bend U-bolt 230 is formed of a throat or base 230A and that extend into two generally parallel legs 231 having threaded ends. The throat 230A is 3 inches long. Each leg 231 is 4 inches in length, and is threaded approximated two inches from its free end, with threads cut to a dimension of $\frac{3}{8}$–16.

The bar 240 has an arc-shaped side 240K, i.e., having a substantially semi-circular convex cross-section, along at least a portion of its length. The bar 240 is approximately $4\frac{3}{8}$ inches in length. It includes two holes H240 that are spaced apart by approximately the same distance as the threaded ends of the square bend U-bolt 230. Typically, the holes H240 are drilled approximately 0.5 inch from each free end of the bar 240, along substantially the axis of symmetry of the bar 240. It should however be understood that for some applications the holes H240 may be offset relative to the axis of symmetry. The holes H240 receive the threaded legs 231 of the square bend U-bolt 230.

In use, the draw bar 78 is fitted into the receiver hitch 270, so that alignment holes 78B in the draw bar 78 and alignment holes H270 in the receiver hitch 270 are aligned to accept a locking style pin (not shown). A first seat 275 is formed between one surface 270A of a receiver hitch collar 271 and the outer surface 270C of the receiver hitch 270. While in this particular illustration the seat 275 has a right angle (i.e., 90 degree) configuration, it should be clear that the seat 275 may be at angles other than 90 degrees. In addition, the seat 275 may be formed by various methods including a weld line, a bar, a screw, a hook, or any other means that creates a perch for seating the throat 230A.

A second seat 277, generally opposite to seat 275 is formed by a surface 270B of the receiver hitch collar 271 and the outer surface E78 of the draw bar 78 similar to the seat 275, the seat 277 may be at any desired angle, and may be formed by various methods, so long as it creates a perch for seating the side 240K of bar 240.

The clamp 220 is then assembled for locking the draw bar 78 and the receiver hitch 270 into a substantially movement free engagement. The convex edge 230B of the throat 230A of the square bend U-bolt 230 is positioned within the seat 275, against the surface 270A of the receiver hitch collar 271 and the outer surface 270C of the receiver hitch 270.

The bar 240 is positioned within the seat 277, so that its convex arc-shaped side 240K rests on the outer surface E78 of the draw bar 78 and the surface 270B of the receiver hitch collar 271. The threaded legs 231 of the square bend U-bolt 230 are aligned with, and inserted into the corresponding holes H240 of the bar 240. While holding the U-bolt 230 and the bar 240 in position, a locking device, such as two nylon stop nuts 260 are threaded onto the legs 231 of the square bend U-bolt 230, and tightened until relative movement of the draw bar 78 and the receiver hitch 270 is eliminated.

Upon tightening the clamp 220, the internal clearance between the draw bar 78 and the receiver hitch 270, along at least one side of the receiver hitch 270 (in this illustration the bottom side), is significantly reduced if not eliminated. The clearance 278 between the remaining sides of the draw bar 78 and the receiver hitch 270 (in this illustration the upper side), is significantly increased. The shifting of the clearance between the various sides of the draw bar 78 and the receiver hitch 270 minimizes the interplay between these two parts, and significantly reduces vibration and "banging".

While the locking device has been described for illustration purpose only, as including two nylon stop nuts 260, it should be clear that other locking devices or fasteners may alternatively be used. For instance, the locking device may include one or two adjustable handles available from Reid Tool Supply, as part number KHA-36. These handles allow for the convenient tightening and loosening of the clamp 220 without the use of a wrench, or other tools, as would be the case if ⅜–16 nylon stop nuts 260 were used.

Figure 29:
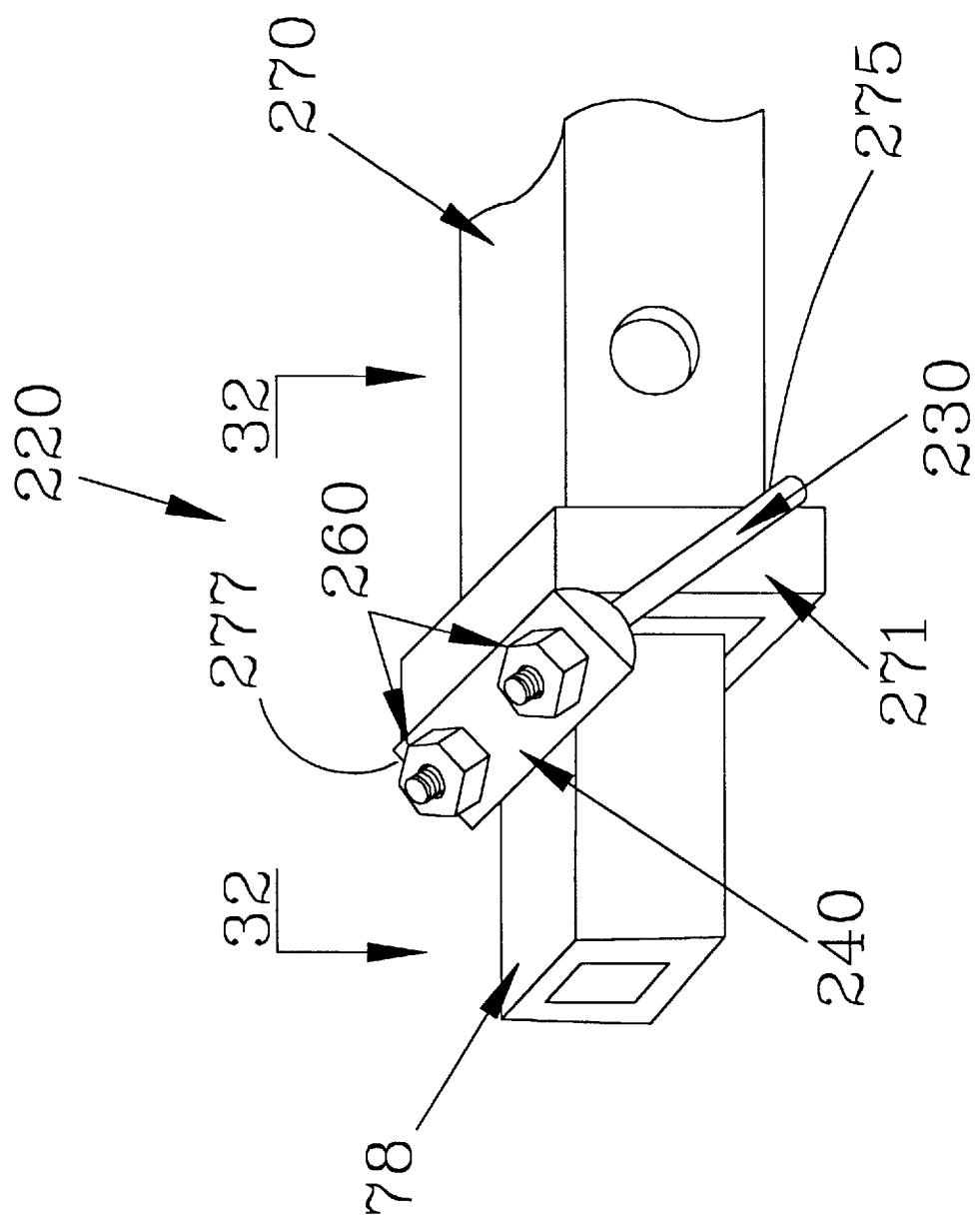
FIG. 29 is an assembled perspective view of the clamp of FIG. 28.
Figure 31:
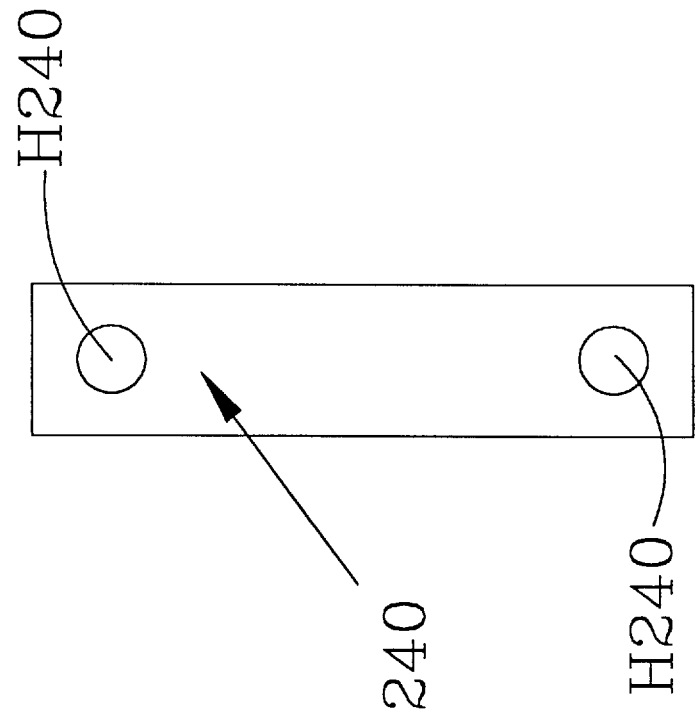
FIG. 31 is a top plan view of a bar forming part of the clamp of FIGS. 28 and 29.
Figure 30:
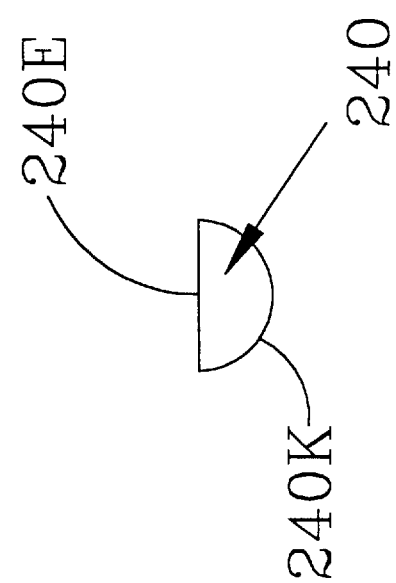
FIG. 30 is an end view of the bar of FIG. 31.
Figure 32:
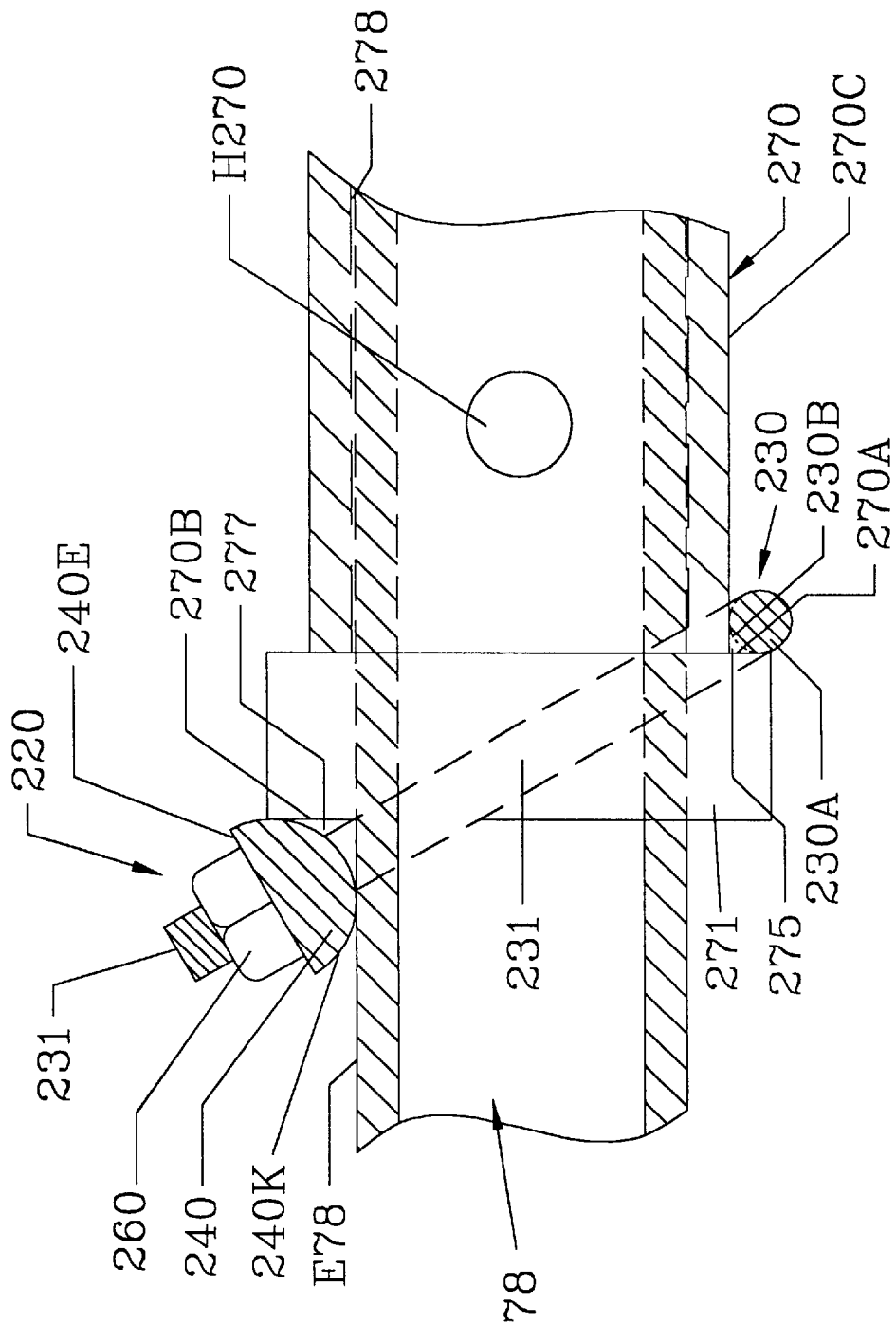
FIG. 32 is an enlarged, side cross-sectional view of the clamp of FIG. 29, taken along line 32—32.
Figure 32B:
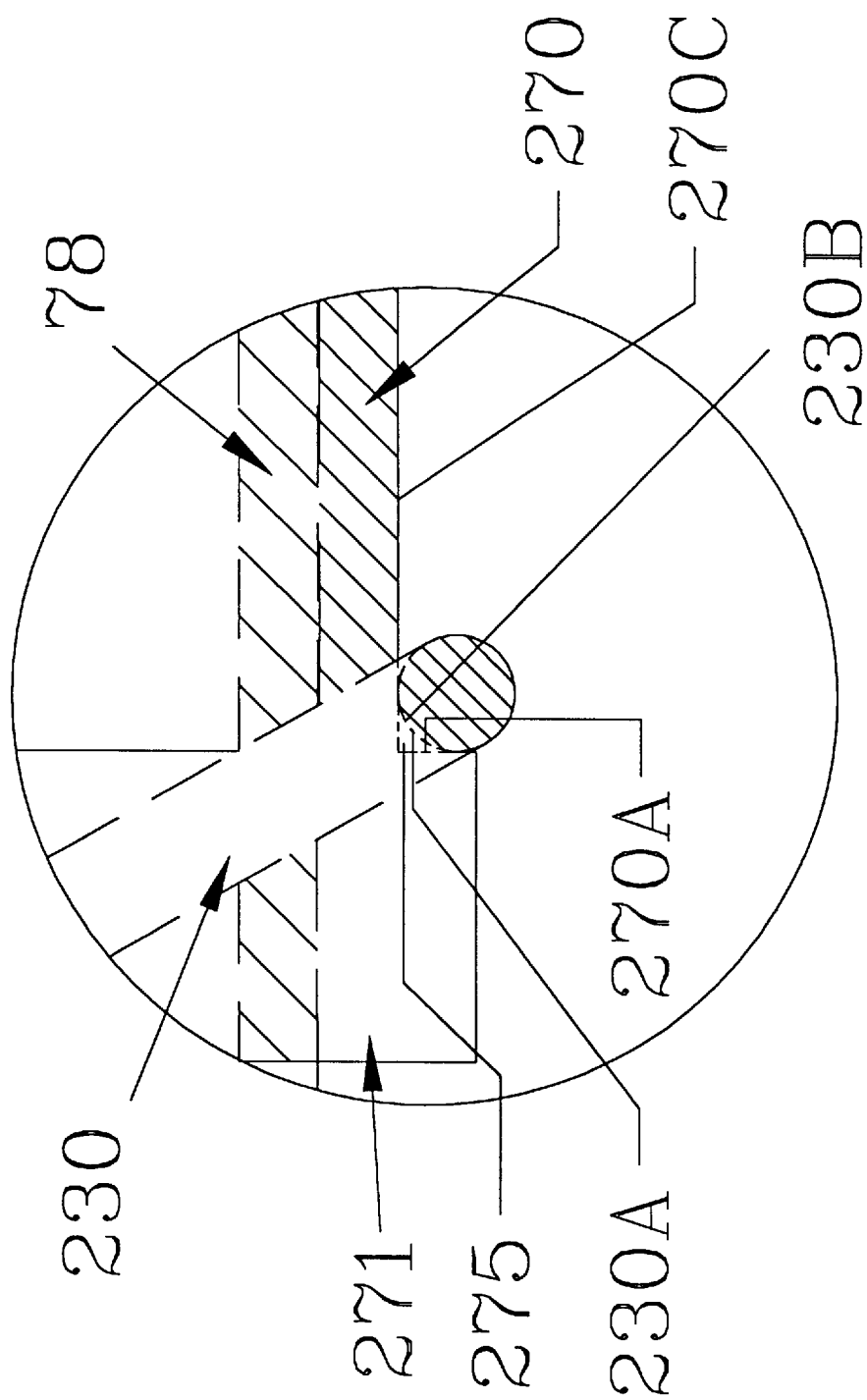
FIG. 32B is another greatly enlarged, close-up view of another seat forming part of the clamp of the present invention.

With reference to FIGS. 29 and 32, when the clamp 220 is fully assembled and locked into position, the throat 230A of the square bend U-bolt (also referred to as first wedge) 230 is tightly wedged against the seat 275, and the bar (also referred to as second wedge) 240 is tightly wedged against the seat 277. While in the present illustration, the first and second wedges 230, 240 are shown to be in opposite linear relation, it should be clear that in other applications these two wedges 230, 240 could be offset relative to each other.

While the holes H240 are shown to be circular, it should be clear that their size, dimension and shape may change according to the desired application. For example, in one embodiment the holes H240 may be oval shapes or wider than the diameter of the legs 231 so that fine adjustment may be made for wedging the bar 240 within the seat 277.

The clamp 220 has the unique ability to be positioned on the draw bar 78 and the receiver hitch 270 along any direction (i.e., 360 degrees). For example, while the present embodiment illustrates the bar 240 as being in the upper left side (relative to the page), and the throat 230 as being the lower right side, it should be clear that these two components of the clamp 220 may be disposed in any position as long as they maintain an opposite linear relationship.

The clamp 220 may be configured for use with receiver hitches and their corresponding draw bars that are sized other than 2 inches. Similar clamp components and assembly processes would be used as described above, however, the components would be resized for the proper size of the receiver hitches and draw bar pairs.

In addition, the clamp 220 may be used with almost any device to be inserted into the receiver hitch 270, such as a bike mount, ski mount, or carrying tray, etc. While the present invention has been described in connection with "clamping" a square shaped draw bar 78 to a square shaped receiver hitch 270, it should be clear that the clamp 220 may be used with bars and/or rods having different shapes, for instance, round, hexagonal, triangular, etc.

An alternative embodiment of the present invention would be the permanent attachment, by such means as welding or bolting, or the incorporation of one or more of the components of the clamp 220 into the manufacture, i.e., as an integral part of the receiver hitch 270, the draw bar 78, or a draw bar like extension tube (used for instance for mounting accessories). Yet another alternative embodiment may be to use the clamp 220 in conjunction with various articles, some of which are listed herein for illustration purpose only, which listing is not intended to be comprehensive: scaffolding, extension poles, extension ladders, telescoping table legs, etc.

Although illustrative embodiments of the present invention have been described in detail with reference to the accompanying drawings, it is to be understood that the invention is not limited to these precise embodiments. The presently preferred embodiments are to be considered as merely illustrative and not restrictive, and a latitude of modifications, changes and substitutions is intended to be encompassed by the foregoing disclosure.

What is claimed is:

1. A clamp comprising:
   a first component defining a first seat;
   a second component defining a second seat, said first and second components being generally co-axially disposed relative to each other;
   a base for wedging within said first seat;
   a bar for wedging within said second seat;
   said first seat and said second seat being disposed in a relatively opposite relation; and
   a locking device for tightly securing said first and second component by causing said base to be wedged within said first seat, and by further causing said bar to be wedged within said second seat, for reducing interplay between said first and second components.

2. A clamp according to claim 1, wherein said base is a throat of a U-bolt.

3. A clamp according to claim 2, wherein said bar includes two holes for receiving two threaded legs of said U-bolt.

4. A clamp according to claim 3, wherein said locking device includes two locking style nuts to be threaded on said legs of said U-bolt.

5. A clamp according to claim 1, wherein said bar includes an arc-shaped side for wedging within said second seat.

6. A clamp according to claim 5, wherein said arc-shaped side has a substantially semi-circular cross-section.

7. A clamp according to claim 5, wherein said base includes an arc-shaped side for wedging within said first seat.

8. A clamp according to claim 1, wherein said first seat is formed by any of a weld line, a bar, a screw, a hook, or a perch.

9. A clamping method comprising:

using a clamp formed of a base, a bar, a locking device, a first component defining a first seat, a second component defining a second seat, wherein said first and second components are generally co-axially disposed relative to each other;

wedging said base within said first seat;

wedging said bar within said second seat;

disposing said first seat and said second seat in a relatively opposite relation; and securing said base and said bar by means of said locking device, by causing said base to be wedged within said first seat, and said bar to be wedged within said second seat, for reducing interplay between said first and second components.

10. A method according to claim 9, wherein wedging said bar includes wedging an arc-shaped side of said bar within said second seat.

11. A clamp comprising:

a first component defining a first seat;

a second component defining a second seat, said first and second components being generally telescopically disposed relative to each other;

a base for wedging within said first seat;

a bar for wedging within said second seat;

said first seat and said second seat being disposed in a relatively opposite relation; and a locking device for tightly securing said first and second components and for reducing interplay therebetween.

12. A clamp according to claim 11, wherein said bar includes an arc-shaped side.

13. A clamp according to claim 11, wherein said base is a throat of a U-bolt.

14. A clamping method comprising:

using a clamp formed of a base, a bar, a locking device, a first component defining a first seat, a second component defining a second seat, wherein said first and second components are generally telescopically disposed relative to each other;

wedging said base within said first seat;

wedging said bar within said second seat;

disposing said first seat and said second seat in a relatively opposite relation; and securing said base and said bar by means of said locking device, by causing said base to be wedged within said first seat, and said bar to be wedged within said second seat, for reducing interplay between said first and second components.

15. A method according to claim 14, wherein wedging said bar includes wedging an arc-shaped side of said bar within said second seat.

* * * * *